(12) United States Patent
Yao et al.

(10) Patent No.: US 11,627,190 B2
(45) Date of Patent: Apr. 11, 2023

(54) TIMER CONTROL METHOD, DATA PACKET PROCESSING METHOD, AND DEVICE

(71) Applicant: Huawei Technologies Co., Ltd., Shenzhen (CN)

(72) Inventors: Chuting Yao, Beijing (CN); Liwei Cui, Xi'an (CN); Chaoling Ye, Beijing (CN); Haibo Xu, Beijing (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/442,934

(22) PCT Filed: Mar. 25, 2020

(86) PCT No.: PCT/CN2020/081006
§ 371 (c)(1),
(2) Date: Sep. 24, 2021

(87) PCT Pub. No.: WO2020/192668
PCT Pub. Date: Oct. 1, 2020

(65) Prior Publication Data
US 2022/0131944 A1    Apr. 28, 2022

(30) Foreign Application Priority Data
Mar. 27, 2019    (CN) .......................... 201910239353.X

(51) Int. Cl.
*G06F 15/16* (2006.01)
*H04L 67/142* (2022.01)

(52) U.S. Cl.
CPC ................................ *H04L 67/142* (2013.01)

(58) Field of Classification Search
CPC .... H04L 67/141; H04L 67/142; H04L 67/143
USPC .................................................. 709/227–228
See application file for complete search history.

(56) References Cited

U.S. PATENT DOCUMENTS

| 10,021,663 | B2* | 7/2018 | Wang .................... H04L 1/1841 |
| 11,032,740 | B2* | 6/2021 | Jo ......................... H04W 88/16 |

(Continued)

FOREIGN PATENT DOCUMENTS

| CN | 101483506 A | 7/2009 |
| CN | 103298048 A | 9/2013 |

(Continued)

OTHER PUBLICATIONS

Huawei, HiSilicon et al."Behaviour of t-Reordering for SRB and AM DRB during PDCP re-establishment", 3GPP TSG-RAN WG2 #100 Reno, USA, Nov. 27-Dec. 1, 2017, R2-1712902, 7 pages.

(Continued)

*Primary Examiner* — Bharat Barot
(74) *Attorney, Agent, or Firm* — Conley Rose, P.C.

(57) ABSTRACT

A timer control method includes a receiving device that performs re-establishment or data recovery on a Packet Data Convergence Protocol (PDCP) layer of the receiving device. The PDCP layer stops the running of a reordering timer of the PDCP layer when the reordering timer is in a running state, where the reordering timer enables the PDCP layer to wait to receive a lost data packet. Because the reordering timer is stopped from running rather than expires, the PDCP layer does not update a value of RX_DELIV.

20 Claims, 7 Drawing Sheets

(56) References Cited

U.S. PATENT DOCUMENTS

| | | | |
|---|---|---|---|
| 11,483,695 B2* | 10/2022 | Tang | H04W 36/0069 |
| 2014/0301188 A1 | 10/2014 | Koskinen | |
| 2015/0215987 A1 | 7/2015 | Kim et al. | |
| 2016/0315868 A1 | 10/2016 | Zhang et al. | |
| 2017/0041767 A1* | 2/2017 | Vajapeyam | H04W 72/04 |
| 2017/0085492 A1 | 3/2017 | Xiao et al. | |
| 2018/0098309 A1 | 4/2018 | Yl et al. | |
| 2019/0044880 A1 | 2/2019 | Yl et al. | |
| 2020/0092939 A1* | 3/2020 | Kim | H04W 76/30 |

FOREIGN PATENT DOCUMENTS

| | | |
|---|---|---|
| CN | 104935413 A | 9/2015 |
| CN | 105229961 A | 1/2016 |
| CN | 106063324 A | 10/2016 |
| CN | 107079005 A | 8/2017 |
| CN | 107342849 A | 11/2017 |
| WO | 2014177099 A1 | 11/2014 |
| WO | 2019031751 A1 | 2/2019 |

OTHER PUBLICATIONS

Motorola Mobility et al.."Correction to PDCP other test cases", 3GPP TSG RAN WG5#79 Busan, South Korea, May 21-25, 2018, R5-182948 ,12 pages.
Qualcomm Inc. et al.,"Correction to 5GS PDCP Test case 7.1.3.5.4 PDCP reordering / Maximum re-ordering delay below t-Reordering / t-Reordering timer operations", 3GPP TSG-RAN WG5 Meeting #80 Gothenburg, Sweden, Aug. 20-24, 2018, R5-184344, 9 pages.

* cited by examiner

TIMER CONTROL METHOD, DATA PACKET PROCESSING METHOD, AND DEVICE

CROSS-REFERENCE TO RELATED APPLICATIONS

This application is a U.S. National Stage of International Patent Application No. PCT/CN2020/081006 filed on Mar. 25, 2020, which claims priority to Chinese Patent Application No. 201910239353.X filed on Mar. 27, 2019, both of which are hereby incorporated by reference in their entireties.

TECHNICAL FIELD

This application relates to the field of communications technologies, and in particular, to a timer control method, a data packet processing method, and a device.

BACKGROUND

Currently, if a terminal device is to perform cell handover or cell change between cells provided by different network devices, the terminal device needs to re-establish a packet data convergence protocol (packet data convergence protocol, PDCP) layer of the terminal device, to adapt to a new network device.

In a PDCP layer re-establishment process, the terminal device does not receive a data packet, and the network device does not send a data packet to the terminal device. Only after the handover or the cell change of the terminal device is completed (duration of the handover or the cell change is greater than or equal to duration of the PDCP layer re-establishment process), the new network device continues to send a data packet to the terminal device. When the PDCP layer is re-established, if a reordering timer has been started at the PDCP layer of the terminal device, the reordering timer may expire in the PDCP layer re-establishment process. In a current processing manner, the terminal device delivers, to an upper layer, all out-of-order data packets received when the reordering timer expires, and updates a value of RX_DELIV. RX_DELIV indicates a count value of the 1st data packet that is not delivered by the PDCP layer to the upper layer previously, and RX_DELIV may be used to determine a valid time window. The valid time window is used by the PDCP layer to determine whether to discard a newly received data packet. For example, if a count value of the received data packet does not fall within the valid time window, the PDCP layer discards the data packet.

After the handover or the cell change of the terminal device is completed, for an acknowledged mode (acknowledged mode, AM) data radio bearer (data radio bearer, DRB), the new network device continues to send, to the terminal device, a data packet for which the terminal does not feed back a reception. After receiving the data packet, the PDCP layer of the terminal device determines whether a number of the data packet is within a valid receive window. Because the value of RX_DELIV has been updated, a count value of the newly received data packet may not be within the valid receive window. In this case, the PDCP layer discards the newly received data packet. However, because the value of RX_DELIV is abnormally updated, the newly received data packet is probably a data packet that is not received by the terminal device before the handover or reselection. Consequently, the data packet that should be received is lost.

SUMMARY

Embodiments of this application provide a timer control method, a data packet processing method, and a device, to reduce a packet loss rate caused due to PDCP layer re-establishment.

According to a first aspect, a first timer control method is provided. The method includes: A receiving device performs re-establishment or data recovery on a PDCP layer of the receiving device; and if a reordering timer of the PDCP layer is in a running state, the PDCP layer stops running of the reordering timer, where the reordering timer is used by the PDCP layer to wait to receive a lost data packet.

The method may be performed by a first communications apparatus. The first communications apparatus may be a receiving device or a communications apparatus such as a chip system that can support a function required by a receiving device to implement the method. For example, an example in which the first communications apparatus is the receiving device is used herein. For example, the receiving device is a terminal device or a network device.

In this embodiment of this application, when the receiving device performs re-establishment or data recovery on the PDCP layer of the receiving device, if the reordering timer is in a running state, the PDCP layer may stop running of the reordering timer. In this manner, expiration of the reordering timer during re-establishment of the PDCP layer can be avoided as much as possible. If the reordering timer is stopped from running rather than expires, the PDCP layer does not deliver a previously received out-of-order data packet to an upper layer, and does not update a value of RX_DELIV. As the value of RX_DELIV is not updated, a valid time window does not change. Therefore, after the PDCP layer re-establishment is completed, if the PDCP layer receives a data packet, the PDCP layer may further perform determining based on the original valid time window. If the newly received data packet is a data packet that is not received by the receiving device before handover or reselection, the PDCP layer may also identify the data packet and may order the received data packet and the data packet that is not delivered to the upper layer previously. In this way, a packet loss rate is reduced, and a probability that the PDCP layer delivers the out-of-order data packet to the upper layer is also reduced as much as possible.

With reference to the first aspect, in a first possible implementation of the first aspect, total duration of the reordering timer is less than a first threshold, and/or remaining running duration of the reordering timer is less than a second threshold; or a time interval used to determine service interruption is greater than or equal to a third threshold, where when a time interval at which the PDCP layer delivers data packets to an upper layer of the PDCP layer twice is greater than or equal to the time interval used to determine service interruption, the upper layer of the PDCP layer determines that service interruption occurs.

If the total duration of the reordering timer is less than the first threshold, it indicates that the total duration of the reordering timer may be relatively short. In this case, when the receiving device performs re-establishment or data recovery on the PDCP layer of the receiving device, if the reordering timer is in a running state, because the total duration of the reordering timer is relatively short, the reordering timer is likely to expire during re-establishment of the PDCP layer. Likewise, in a case in which the remaining running duration of the reordering timer is less than the second threshold, when the receiving device performs re-establishment or data recovery on the PDCP layer of the receiving device, if the reordering timer is in a running state, because the remaining running duration of the reordering timer is relatively short, the reordering timer is likely to expire during re-establishment of the PDCP layer. Therefore, on this premise, the technical solutions provided in this embodiment of this application may be applied as much as possible to a case in which a probability that the reordering timer expires during re-establishment of the PDCP layer is relatively high, so that the technical solutions in this embodiment of this application are more pertinently applied.

In addition, after receiving a data packet, the PDCP layer delivers an in-order data packet to the upper layer, and delivers an out-of-order data packet to the upper layer after ordering is completed or when the reordering timer expires. In this case, the upper layer, such as an IP/TCP layer, of the PDCP layer usually determines a service continuity status based on a time interval at which data packets are received twice. If the upper layer of the PDCP layer determines that the time interval at which the data packets delivered by the PDCP layer are received twice is greater than or equal to a first time interval, the upper layer of the PDCP layer determines that service interruption occurs, and then the upper layer of the PDCP layer may re-initiate a service request. If the upper layer of the PDCP layer re-initiates the service request, discontinuity actually occurs for a user. This affects user experience and causes transmission quality deterioration. However, in the technical solutions provided in this embodiment of this application, running of the reordering timer is stopped, and when running of the reordering timer is stopped, the previous out-of-order data packet is not delivered to the upper layer. Therefore, the upper layer may not receive, within a relatively long time period, a data packet delivered by the PDCP layer. In this case, if the time interval used to determine service interruption is relatively short, the upper layer may consider that service interruption occurs, and re-initiate the service request. Therefore, an application prerequisite of this embodiment of this application may be that the first time interval is greater than or equal to the third threshold. If the first time interval is greater than or equal to the third threshold, it indicates that the time interval used to determine service interruption is relatively long. In this case, even if the PDCP layer does not deliver a data packet to the upper layer within a relatively long time period, the upper layer may not consider that service interruption occurs. Therefore, in this scenario, the technical solutions in this embodiment of this application are applicable. This is equivalent to that the technical solutions in this embodiment of this application may be applied as much as possible to a scenario in which service continuity is not affected.

With reference to the first aspect or the first possible implementation of the first aspect, in a second possible implementation of the first aspect, the method further includes: The PDCP layer resets the reordering timer.

In addition to stopping the reordering timer, the PDCP layer may further reset the reordering timer, so that timing can be restarted when the reordering timer is started next time.

With reference to the first aspect, the first possible implementation of the first aspect, or the second possible implementation of the first aspect, in a third possible implementation of the first aspect, after the PDCP layer stops running of the reordering timer, the method further includes: The PDCP layer starts the reordering timer when a first condition is satisfied.

The upper layer, such as an IP/TCP layer, of the PDCP layer usually determines a service continuity status based on a time interval at which data packets are received twice. If the upper layer of the PDCP layer determines that the time interval at which the data packets delivered by the PDCP layer are received twice is greater than or equal to a first time interval, the upper layer of the PDCP layer determines that service interruption occurs, and then the upper layer of the PDCP layer may re-initiate a service request. However, in the technical solutions provided in this embodiment of this application, running of the reordering timer is stopped, and when running of the reordering timer is stopped, the previous out-of-order data packet is not delivered to the upper layer. Therefore, the upper layer may not receive, within a relatively long time period, a data packet delivered by the PDCP layer. Therefore, to avoid as much as possible a case in which the upper layer determines that service interruption occurs, in this embodiment of this application, in addition to considering stopping running of the reordering timer when PDCP re-establishment or data recovery is performed, how to restart the reordering timer as soon as possible may be further considered, to recover as soon as possible a mechanism for delivering a data packet to the upper layer, so that the upper layer can receive the data packet from the PDCP layer as early as possible.

With reference to the third possible implementation of the first aspect, in a fourth possible implementation of the first aspect, the first condition includes one or any combination of the following:

the PDCP layer receives a first data packet, and the PDCP layer determines that a value obtained by adding 1 to a largest count value of a data packet received by the PDCP layer is greater than a count value of the 1st data packet that is not received by the PDCP layer before the reordering timer is last started;

the PDCP layer receives a first data packet, and the PDCP layer determines that a value obtained by adding 1 to a largest count value of a data packet received by the PDCP layer is greater than a count value of the 1st data packet that is not received by the PDCP layer;

the PDCP layer receives a first data packet, and the PDCP layer determines that a first variable is greater than a second variable, where the first variable is used to indicate a count value of a next data packet that the receiving device expects to receive, and the second variable indicates a count value of the 1st data packet that is not delivered to the upper layer and for which the PDCP layer still waits;

the receiving device completes sending a radio resource control RRC connection establishment complete message to a network device, where the RRC connection complete message is used to indicate that the receiving device completes cell handover or change; or the receiving device completes sending a status report to a network device, where the status report is used to indicate information about a data packet received by the receiving device before the receiving device is handed over to the network device.

The first condition may include a plurality of conditions, and this is not specifically limited. The first condition may be configured by the network device, or may be specified in a protocol.

With reference to any one of the first possible implementation of the first aspect to the fourth possible implementation of the first aspect, m a fifth possible implementation of the first aspect, the re-establishment of the PDCP layer is re-establishment of a PDCP layer for an AM DRB; or the data recovery of the PDCP layer is data recovery of a PDCP layer for an AM DRB.

For an AM, a MAC layer supports a HARQ mechanism. Data packets received by the receiving device may be out of order due to parallel running of a plurality of HARQ processes. An RLC layer supports an ARQ mechanism. This may also cause a result that received data packets are out of order. Therefore, in this embodiment of this application, the re-establishment of the PDCP layer may be the PDCP layer re-establishment for the AM DRB, or the data recovery of the PDCP layer may be the PDCP layer data recovery for the AM DRB.

According to a second aspect, a second timer control method is provided. The method includes: A receiving device performs re-establishment or data recovery on a PDCP layer of the receiving device; and if a reordering timer of the PDCP layer is in a running state, the PDCP layer restarts the reordering timer, where the reordering timer is used by the PDCP layer to wait to receive a lost data packet.

The method may be performed by a second communications apparatus. The second communications apparatus may be a receiving device or a communications apparatus such as a chip system that can support a function required by a receiving device to implement the method. For example, an example in which the second communications apparatus is the receiving device is used herein. For example, the receiving device is a terminal device or a network device.

When the receiving device performs re-establishment or data recovery on the PDCP layer of the receiving device, if the reordering timer is in a running state, the PDCP layer restarts the reordering timer. In addition, because the reordering timer is restarted rather than expires, the PDCP layer does not deliver a previous out-of-order data packet to an upper layer of the PDCP layer, that is, does not deliver, to the upper layer of the PDCP layer, a data packet whose count value is greater than a count value of the 1st data packet that is not received by the PDCP layer, and does not update a value of RX_DELIV. As the value of RX_DELIV is not updated, a valid time window does not change. Therefore, after the PDCP layer re-establishment is completed, if the receiving device receives a data packet, the receiving device may further perform determining based on the original valid time window. If the newly received data packet is a data packet that is not received by the receiving device before handover or reselection, the receiving device may also identify the data packet and may order the received data packet and the data packet that is not delivered to the upper layer previously. In this way, a packet loss rate is reduced, and a probability that the PDCP layer delivers the out-of-order data packet to the upper layer is also reduced as much as possible. This ensures as much as possible that all data packets received by the upper layer are in order.

With reference to the second aspect, in a first possible implementation of the second aspect, total duration of the reordering timer is less than a first threshold, and/or remaining running duration of the reordering timer is less than a second threshold; or a time interval used to determine service interruption is greater than or equal to a third threshold, where when a time interval at which the PDCP layer delivers data packets to an upper layer of the PDCP layer twice is greater than or equal to the time interval used to determine service interruption, the upper layer of the PDCP layer determines that service interruption occurs.

With reference to the second aspect or the first possible implementation of the second aspect, in a second possible implementation of the second aspect, that the PDCP layer restarts the reordering timer includes: The PDCP layer stops and resets the reordering timer, and restarts the reordering timer.

A concept of "restart" is described.

With reference to the second aspect, the first possible implementation of the second aspect, or the second possible implementation of the second aspect, in a third possible implementation of the second aspect, in a re-establishment process of the PDCP layer, the method further includes: When the reordering timer expires, the PDCP layer restarts the reordering timer, and does not deliver, to the upper layer of the PDCP layer, a data packet whose count value is greater than a count value of the 1st data packet that is not received by the PDCP layer.

Although the reordering timer is restarted when the PDCP layer is re-established, in a process of re-establishing the PDCP layer, the reordering timer may still expire. For example, if the re-establishment process of the PDCP layer is relatively long, or the total duration of the reordering timer is relatively short, the reordering timer may expire in the re-establishment process of the PDCP layer. In this embodiment of this application, in the re-establishment process of the PDCP layer, when the reordering timer expires, the PDCP layer may restart the reordering timer. In addition, because the reordering timer is restarted rather than expires, the PDCP layer does not deliver a previous out-of-order data packet to the upper layer of the PDCP layer, that is, does not deliver, to the upper layer of the PDCP layer, the data packet whose count value is greater than the count value of the 1st data packet that is not received by the PDCP layer, and does not update a value of RX_DELIV. In this manner, it can be avoided as much as possible that the reordering timer expires in the re-establishment process of the PDCP layer, and a packet loss rate can be reduced.

With reference to the second aspect, the first possible implementation of the second aspect, the second possible implementation of the second aspect, or the third possible implementation of the second aspect, in a fourth possible implementation of the second aspect, the re-establishment of the PDCP layer is re-establishment of a PDCP layer for an AM DRB; or the data recovery of the PDCP layer is data recovery of a PDCP layer for an AM DRB.

For technical effects brought by the second aspect or the implementations of the second aspect, refer to the descriptions of the technical effects of the first aspect or the implementations of the first aspect. Details are not described again.

According to a third aspect, a data packet processing method is provided. The method includes: A receiving device determines that a reordering timer of a packet data convergence protocol PDCP layer of the receiving device expires, where the reordering timer is used by the PDCP layer to wait to receive a lost data packet; and when a first condition is satisfied, the PDCP layer does not deliver, to an upper layer of the PDCP layer, a data packet whose count value is greater than a count value of the 1st data packet that is not received by the PDCP layer.

The method may be performed by a third communications apparatus. The third communications apparatus may be a receiving device or a communications apparatus such as a chip system that can support a function required by a receiving device to implement the method. For example, an example in which the third communications apparatus is the receiving device is used herein. For example, the receiving device is a terminal device or a network device.

When the first condition is satisfied, if the reordering timer is in a running state, the PDCP layer may not deliver a previously received out-of-order data packet to the upper layer, that is, not deliver, to the upper layer of the PDCP layer, the data packet whose count value is greater than the count value of the 1st data packet that is not received by the PDCP layer. In addition, because the PDCP layer does not deliver the previously received out-of-order data packet to the upper layer, a value of RX_DELIV is not updated. As the value of RX_DELIV is not updated, a valid time window does not change. Therefore, after PDCP layer re-establishment is completed, if the PDCP layer receives a data packet, the PDCP layer may further perform determining based on the original valid time window. If the newly received data packet is a data packet that is not received by the receiving device before handover or reselection, the PDCP layer may also identify the data packet and may order the received data packet and the data packet that is not delivered to the upper layer previously. In this way, a packet loss rate is reduced, and a probability that the PDCP layer delivers the out-of-order data packet to the upper layer is also reduced as much as possible.

With reference to the third aspect, in a first possible implementation of the third aspect, when the first condition is satisfied, the method further includes: The PDCP layer stops and resets the reordering timer, and restarts the reordering timer.

When the first condition is satisfied, in addition to not delivering, to the upper layer of the PDCP layer, the data packet whose count value is greater than the count value of the 1st data packet that is not received by the PDCP layer, the PDCP layer of the receiving device may further restart the reordering timer, so that the reordering timer continuously runs. In this manner, the PDCP layer can be prevented from delivering a previously received out-of-order data packet to the upper layer, that is, delivering, to the upper layer of the PDCP layer, the data packet whose count value is greater than the count value of the 1st data packet that is not received by the PDCP layer.

With reference to the third aspect or the first possible implementation of the third aspect, in a second possible implementation of the third aspect, the first condition includes one or any combination of the following:

before the receiving device re-establishes the PDCP layer;

in a process in which the receiving device re-establishes the PDCP layer;

after the receiving device completes cell handover and before the PDCP layer receives the 1st data packet;

the receiving device completes sending a radio resource control RRC connection establishment complete message to a network device, where the RRC connection establishment complete message is used to indicate that the receiving device completes cell handover;

the receiving device completes sending a status report to a network device, where the status report is used to indicate information about a data packet received by the receiving device before the receiving device is handed over to the network device; or before the receiving device completes a random access process.

The first condition may include a plurality of conditions, and this is not specifically limited.

With reference to the third aspect, the first possible implementation of the third aspect, or the second possible implementation of the third aspect, in a third possible implementation of the third aspect, total duration of the reordering timer is less than a first threshold, and/or remaining running duration of the reordering timer is less than a second threshold; or a time interval used to determine service interruption is greater than or equal to a third threshold, where when a time interval at which the PDCP layer delivers data packets to the upper layer of the PDCP layer twice is greater than or equal to the time interval used to determine service interruption, the upper layer of the PDCP layer determines that service interruption occurs.

With reference to the second possible implementation of the third aspect, in a fourth possible implementation of the third aspect, the re-establishment of the PDCP layer is re-establishment of a PDCP layer for an AM DRB; or data recovery of the PDCP layer is data recovery of a PDCP layer for an AM DRB.

For technical effects brought by the third aspect or the implementations of the third aspect, refer to the descriptions of the technical effects of the first aspect or the implementations of the first aspect. Details are not described again.

According to a fourth aspect, a first type of communications apparatus is provided. For example, the communications apparatus is the first communications apparatus described above. The communications apparatus includes a processor and a memory. Optionally, the communications apparatus may further include a transceiver. The processor, the memory, and the transceiver may be configured to implement the method described in the first aspect or the possible designs of the first aspect. For example, the communications apparatus is a chip disposed in a communications device. For example, the communications device is a receiving device. For example, the receiving device is a terminal device or a network device. For example, the transceiver is implemented by using an antenna, a feeder, and a codec in the communications device. Alternatively, if the communications apparatus is the chip disposed in the communications device, the transceiver is, for example, a communications interface in the chip. The communications interface is connected to a radio frequency transceiver component in the communications device, to receive and send information by using the radio frequency transceiver component.

The memory is configured to store instructions.

The processor is configured to execute the instructions stored in the memory, to perform re-establishment or data recovery on a PDCP layer of the communications device; and if a reordering timer of the PDCP layer is in a running state, stop running of the reordering timer by using the PDCP layer, where the reordering timer is used by the PDCP layer to wait to receive a lost data packet.

With reference to the fourth aspect, in a first possible implementation of the fourth aspect, total duration of the reordering timer is less than a first threshold, and/or remaining running duration of the reordering timer is less than a second threshold; or a time interval used to determine service interruption is greater than or equal to a third threshold, where when a time interval at which the PDCP layer delivers data packets to an upper layer of the PDCP layer twice is greater than or equal to the time interval used to determine service interruption, the upper layer of the PDCP layer determines that service interruption occurs.

With reference to the fourth aspect or the first possible implementation of the fourth aspect, in a second possible implementation of the fourth aspect, the processor is further configured to reset the reordering timer by using the PDCP layer.

With reference to the fourth aspect, the first possible implementation of the fourth aspect, or the second possible implementation of the fourth aspect, in a third possible implementation of the fourth aspect, the processor is further configured to: after stopping running of the reordering timer by using the PDCP layer, start the reordering timer by using the PDCP layer when a first condition is satisfied.

With reference to the third possible implementation of the fourth aspect, in a fourth possible implementation of the fourth aspect, the communications device further includes the transceiver, and the first condition includes one or any combination of the following:

the processor receives a first data packet by using the PDCP layer, and the processor determines, by using the PDCP layer, that a value obtained by adding 1 to a largest count value of a data packet received by the PDCP layer is greater than a count value of the 1st data packet that is not received by the PDCP layer before the reordering timer is last started;

the processor receives a first data packet by using the PDCP layer, and the processor determines, by using the PDCP layer, that a value obtained by adding 1 to a largest count value of a data packet received by the PDCP layer is greater than a count value of the 1st data packet that is not received by the PDCP layer;

the processor receives a first data packet by using the PDCP layer, and the processor determines, by using the PDCP layer, that a first variable is greater than a second variable, where the first variable is used to indicate a count value of a next data packet that the communications device expects to receive, and the second variable indicates a count value of the 1st data packet that is not delivered to the upper layer and for which the PDCP layer still waits;

the transceiver completes sending an RRC connection establishment complete message to a network device, where the RRC connection complete message is used to indicate that the communications device completes cell handover or change; or the transceiver completes sending a status report to a network device, where the status report is used to indicate information about a data packet received by the communications device before the communications device is handed over to the network device.

With reference to any one of the first possible implementation of the fourth aspect to the fourth possible implementation of the fourth aspect, in a fifth possible implementation of the fourth aspect, the re-establishment of the PDCP layer is re-establishment of a PDCP layer for an AM DRB; or the data recovery of the PDCP layer is data recovery of a PDCP layer for an AM DRB.

For technical effects brought by the fourth aspect or the implementations of the fourth aspect, refer to the descriptions of the technical effects of the first aspect or the implementations of the first aspect. Details are not described again.

According to a fifth aspect, a second type of communications apparatus is provided. For example, the communications apparatus is the second communications apparatus described above. The communications apparatus includes a processor and a memory. Optionally, the communications apparatus may further include a transceiver. The processor, the memory, and the transceiver may be configured to implement the method described in the second aspect or the possible designs of the second aspect. For example, the communications apparatus is a chip disposed in a communications device. For example, the communications device is a receiving device. For example, the receiving device is a terminal device or a network device. For example, the transceiver is implemented by using an antenna, a feeder, and a codec in the communications device. Alternatively, if the communications apparatus is the chip disposed in the communications device, the transceiver is, for example, a communications interface in the chip. The communications interface is connected to a radio frequency transceiver component in the communications device, to receive and send information by using the radio frequency transceiver component.

The memory is configured to store instructions.

The processor is configured to execute the instructions stored in the memory, to perform re-establishment or data recovery on a PDCP layer of the communications device; and if a reordering timer of the PDCP layer is in a running state, restart the reordering timer by using the PDCP layer, where the reordering timer is used by the PDCP layer to wait to receive a lost data packet.

With reference to the fifth aspect, in a first possible implementation of the fifth aspect, total duration of the reordering timer is less than a first threshold, and/or remaining running duration of the reordering timer is less than a second threshold; or a time interval used to determine service interruption is greater than or equal to a third threshold, where when a time interval at which the PDCP layer delivers data packets to an upper layer of the PDCP layer twice is greater than or equal to the time interval used to determine service interruption, the processor determines, by using the upper layer of the PDCP layer, that service interruption occurs.

With reference to the fifth aspect or the first possible implementation of the fifth aspect, in a second possible implementation of the fifth aspect, the processor is configured to restart the reordering timer by using the PDCP layer in the following manner:

stopping and resetting the reordering timer by using the PDCP layer, and restarting the reordering timer.

With reference to the fifth aspect, the first possible implementation of the fifth aspect, or the second possible implementation of the fifth aspect, in a third possible implementation of the fifth aspect, in a process in which the processor re-establishes the PDCP layer, the processor is further configured to: when the reordering timer expires, restart the reordering timer by using the PDCP layer; and not deliver, to the upper layer of the PDCP layer, a data packet whose count value is greater than a count value of the 1st data packet that is not received by the PDCP layer.

With reference to the fifth aspect, the first possible implementation of the fifth aspect, the second possible implementation of the fifth aspect, or the third possible implementation of the fifth aspect, in a fourth possible implementation of the fifth aspect, the re-establishment of the PDCP layer is re-establishment of a PDCP layer for an AM DRB, or the data recovery of the PDCP layer is data recovery of a PDCP layer for an AM DRB.

For technical effects brought by the fifth aspect or die implementations of the fifth aspect, refer to the descriptions of the technical effects of the second aspect or the implementations of the second aspect. Details are not described again.

According to a sixth aspect, a third type of communications apparatus is provided. For example, the communications apparatus is the third communications apparatus described above. The communications apparatus includes a processor and a memory. Optionally, the communications apparatus may further include a transceiver. The processor, the memory, and the transceiver may be configured to implement the method described in the third aspect or the possible designs of the third aspect. For example, the communications apparatus is a chip disposed in a communications device. For example, the communications device is a receiving device. For example, the receiving device is a terminal device or a network device. For example, the transceiver is implemented by using an antenna, a feeder, and a codec in the communications device. Alternatively, if the communications apparatus is the chip disposed in the communications device, the transceiver is, for example, a communications interface in the chip. The communications interface is connected to a radio frequency transceiver component in the communications device, to receive and send information by using the radio frequency transceiver component.

The memory is configured to store instructions.

The processor is configured to execute the instructions stored in the memory, to determine that a reordering timer of a PDCP layer of the communications device expires; and when a first condition is satisfied, not deliver, to an upper layer of the PDCP layer by using the PDCP layer, a data packet whose count value is greater than a count value of the 1st data packet that is not received by the PDCP layer, where the reordering timer is used by the PDCP layer to wait to receive a lost data packet.

With reference to the sixth aspect, in a first possible implementation of the sixth aspect, the processor is further configured to: when the first condition is satisfied, stop and reset the reordering timer by using the PDCP layer, and restart the reordering timer.

With reference to the sixth aspect or the first possible implementation of the sixth aspect, in a second possible implementation of the sixth aspect, the communications device further includes the transceiver, and the first condition includes one or any combination of the following:

before the communications device re-establishes the PDCP layer;

in a process in which the communications device re-establishes the PDCP layer;

after the communications device completes cell handover and before the PDCP layer receives the 1st data packet;

the transceiver completes sending an RRC connection establishment complete message to a network device, where the RRC connection establishment complete message is used to indicate that the communications device completes cell handover;

the transceiver completes sending a status report to a network device, where the status report is used to indicate information about a data packet received by the communications device before the communications device is handed over to the network device; or before the communications device completes a random access process.

With reference to the sixth aspect, the first possible implementation of the sixth aspect, or the second possible implementation of the sixth aspect, in a third possible implementation of the sixth aspect, total duration of the reordering timer is less than a first threshold, and/or remaining running duration of the reordering timer is less than a second threshold; or a time interval used to determine service interruption is greater than or equal to a third threshold, where when a time interval at which the PDCP layer delivers data packets to the upper layer of the PDCP layer twice is greater than or equal to the time interval used to determine service interruption, the processor determines, by using the upper layer of the PDCP layer, that service interruption occurs.

With reference to the second possible implementation of the sixth aspect, in a fourth possible implementation of the sixth aspect, the re-establishment of the PDCP layer is re-establishment of a PDCP layer for an AM DRB; or data recovery of the PDCP layer is data recovery of a PDCP layer for an AM DRB.

For technical effects brought by the sixth aspect or the implementations of the sixth aspect, refer to the descriptions of the technical effects of the third aspect or the implementations of the third aspect. Details are not described again.

According to a seventh aspect, a fourth type of communications apparatus is provided. For example, the communications apparatus is the first communications apparatus described above. The communications apparatus is configured to perform the method in any one of the first aspect or the possible implementations of the first aspect. Specifically, the communications apparatus may include modules configured to perform the method in any one of the first aspect or the possible implementations of the first aspect, for example, include a processing module and a storage module that are coupled to each other, and optionally, further include a transceiver module. For example, the communications apparatus is a communications device. For example, the communications device is a receiving device. For example, the receiving device is a terminal device or a network device.

The storage module is configured to store instructions.

The processing module is configured to execute the instructions stored in the storage module, to perform re-establishment or data recovery on a PDCP layer of the communications device; and if a reordering timer of the PDCP layer is in a running state, stop running of the reordering timer by using the PDCP layer, where the reordering timer is used by the PDCP layer to wait to receive a lost data packet.

With reference to the seventh aspect, in a first possible implementation of the seventh aspect, total duration of the reordering timer is less than a first threshold, and/or remaining running duration of the reordering timer is less than a second threshold; or a time interval used to determine service interruption is greater than or equal to a third threshold, where when a time interval at which the PDCP layer delivers data packets to an upper layer of the PDCP layer twice is greater than or equal to the time interval used to determine service interruption, the upper layer of the PDCP layer determines that service interruption occurs.

With reference to the seventh aspect or the first possible implementation of the seventh aspect, in a second possible implementation of the seventh aspect, the processing module is further configured to reset the reordering timer by using the PDCP layer.

With reference to the seventh aspect, the first possible implementation of the seventh aspect, or the second possible implementation of the seventh aspect, in a third possible implementation of the seventh aspect, the processing module is further configured to: after stopping running of the reordering timer by using the PDCP layer, start the reordering timer by using the PDCP layer when a first condition is satisfied.

With reference to the third possible implementation of the seventh aspect, in a fourth possible implementation of the seventh aspect, the communications device further includes the transceiver module, and the first condition includes one or any combination of the following:

the processing module receives a first data packet by using the PDCP layer, and the processing module determines, by using the PDCP layer, that a value obtained by adding 1 to a largest count value of a data packet received by the PDCP layer is greater than a count value of the 1st data packet that is not received by the PDCP layer before the reordering timer is last started;

the processing module receives a first data packet by using the PDCP layer, and the processing module determines, by using the PDCP layer, that a value obtained by adding 1 to a largest count value of a data packet received by the PDCP layer is greater than a count value of the 1st data packet that is not received by the PDCP layer;

the processing module receives a first data packet by using the PDCP layer, and the processing module determines, by using the PDCP layer, that a first variable is greater than a second variable, where the first variable is used to indicate a count value of a next data packet that the communications device expects to receive, and the second variable indicates a count value of the 1st data packet that is not delivered to the upper layer and for which the PDCP layer still waits;

the transceiver module completes sending an RRC connection establishment complete message to a network device, where the RRC connection complete message is used to indicate that the communications device completes cell handover or change; or the transceiver module completes sending a status report to a network device, where the status report is used to indicate information about a data packet received by the communications device before the communications device is handed over to the network device.

With reference to any one of the first possible implementation of the seventh aspect to the fourth possible implementation of the seventh aspect, in a fifth possible implementation of the seventh aspect, the re-establishment of the PDCP layer is re-establishment of a PDCP layer for an AM DRB; or the data recovery of the PDCP layer is data recovery of a PDCP layer for an AM DRB.

For technical effects brought by the seventh aspect or the implementations of the seventh aspect, refer to the descriptions of the technical effects of the first aspect or the implementations of the first aspect. Details are not described again.

According to an eighth aspect, a fifth type of communications apparatus is provided. For example, the communications apparatus is the second communications apparatus described above. The communications apparatus is configured to perform the method in any one of the second aspect or the possible implementations of the second aspect. Specifically, the communications apparatus may include modules configured to perform the method in any one of the second aspect or the possible implementations of the second aspect, for example, include a processing module and a storage module that are coupled to each other, and optionally, further include a transceiver module. For example, the communications apparatus is a communications device. For example, the communications device is a receiving device.

For example, the receiving device is a terminal device or a network device.

The storage module is configured to store instructions.

The processing module is configured to execute the instructions stored in the storage module, to perform re-establishment or data recovery on a PDCP layer of the communications device; and if a reordering timer of the PDCP layer is in a running state, restart the reordering timer by using the PDCP layer, where the reordering timer is used by the PDCP layer to wait to receive a lost data packet.

With reference to the eighth aspect, in a first possible implementation of the eighth aspect.

total duration of the reordering timer is less than a first threshold, and/or remaining running duration of the reordering timer is less than a second threshold; or a time interval used to determine service interruption is greater than or equal to a third threshold, where when a time interval at which the PDCP layer delivers data packets to an upper layer of the PDCP layer twice is greater than or equal to the time interval used to determine service interruption, the processing module determines, by using the upper layer of the PDCP layer, that service interruption occurs.

With reference to the eighth aspect or the first possible implementation of the eighth aspect, in a second possible implementation of the eighth aspect, the processing module is configured to restart the reordering timer by using the PDCP layer in the following manner:

stopping and resetting the reordering timer by using the PDCP layer, and restarting the reordering timer.

With reference to the eighth aspect, the first possible implementation of the eighth aspect, or the second possible implementation of the eighth aspect, in a third possible implementation of the eighth aspect, in a process in which the processing module re-establishes the PDCP layer, the processing module is further configured to: when the reordering timer expires, restart the reordering timer by using the PDCP layer, and not deliver, to the upper layer of the PDCP layer, a data packet whose count value is greater than a count value of the 1st data packet that is not received by the PDCP layer.

With reference to the eighth aspect, the first possible implementation of the eighth aspect, the second possible implementation of the eighth aspect, or the third possible implementation of the eighth aspect, in a fourth possible implementation of the eighth aspect, the re-establishment of the PDCP layer is re-establishment of a PDCP layer for an AM DRB, or the data recovery of the PDCP layer is data recovery of a PDCP layer for an AM DRB.

For technical effects brought by the eighth aspect or the implementations of the eighth aspect, refer to the descriptions of the technical effects of the second aspect or the implementations of the second aspect. Details are not described again.

According to a ninth aspect, a sixth type of communications apparatus is provided. For example, the communications apparatus is the third communications apparatus described above. The communications apparatus is configured to perform the method in any one of the third aspect or the possible implementations of the third aspect. Specifically, the communications apparatus may include modules configured to perform the method in any one of the third aspect or the possible implementations of the third aspect, for example, include a processing module and a storage module that are coupled to each other, and optionally, further include a transceiver module. For example, the communications apparatus is a communications device. For example, the communications device is a receiving device. For example, the receiving device is a terminal device or a network device.

The storage module is configured to store instructions.

The processing module is configured to execute the instructions stored in the storage module, to determine that a reordering timer of a PDCP layer of the communications device expires; and when a first condition is satisfied, not deliver, to an upper layer of the PDCP layer by using the PDCP layer, a data packet whose count value is greater than a count value of the 1st data packet that is not received by the PDCP layer, where the reordering timer is used by the PDCP layer to wait to receive a lost data packet.

With reference to the ninth aspect, in a first possible implementation of the ninth aspect, the processing module is further configured to: when the first condition is satisfied, stop and reset the reordering tuner by using the PDCP layer, and restart the reordering timer.

With reference to the ninth aspect or the first possible implementation of the ninth aspect, in a second possible implementation of the ninth aspect, the communications device further includes the transceiver module, and the first condition includes one or any combination of the following:

before the communications device re-establishes the PDCP layer;

in a process in which the communications device re-establishes the PDCP layer;

after the communications device completes cell handover and before the PDCP layer receives the 1st data packet;

the transceiver module completes sending an RRC connection establishment complete message to a network device, where the RRC connection establishment complete message is used to indicate that the communications device completes cell handover;

the transceiver module completes sending a status report to a network device, where the status report is used to indicate information about a data packet received by the communications device before the communications device is handed over to the network device; or before the communications device completes a random access process.

With reference to the ninth aspect, the first possible implementation of the ninth aspect, or the second possible implementation of the ninth aspect, in a third possible implementation of the ninth aspect, total duration of the reordering timer is less than a first threshold, and/or remaining running duration of the reordering timer is less than a second threshold; or a time interval used to determine service interruption is greater than or equal to a third threshold, where when a time interval at which the PDCP layer delivers data packets to the upper layer of the PDCP layer twice is greater than or equal to the time interval used to determine service interruption, the processing module determines, by using the upper layer of the PDCP layer, that service interruption occurs.

With reference to the second possible implementation of the ninth aspect, in a fourth possible implementation of the ninth aspect.

the re-establishment of the PDCP layer is re-establishment of a PDCP layer for an AM DRB; or data recovery of the PDCP layer is data recovery of a PDCP layer for an AM DRB.

For technical effects brought by the ninth aspect or the implementations of the ninth aspect, refer to the descriptions of the technical effects of the third aspect or the implementations of the third aspect. Details are not described again.

According to a tenth aspect, a seventh type of communications apparatus is provided. The communications apparatus may be the first communications apparatus in the foregoing method designs. For example, the communications apparatus is a chip disposed in a communications device. For example, the communications device is a receiving device. For example, the receiving device is a terminal device or a network device. The communications apparatus includes: a memory, configured to store computer-executable program code; and a processor, where the processor is coupled to the memory. The program code stored in the memory includes instructions. When the processor executes the instructions, the seventh type of communications apparatus is enabled to perform the method in any one of the first aspect or the possible implementations of the first aspect.

The seventh type of communications apparatus may further include a communications interface. The communications interface may be a transceiver in the communications device, for example, implemented by using an antenna, a feeder, and a codec in the communications apparatus. Alternatively, if the seventh type of communications apparatus is the chip disposed in the communications device, the communications interface may be an input/output interface in the chip, for example, an input/output pin.

According to an eleventh aspect, an eighth type of communications apparatus is provided. The communications apparatus may be the second communications apparatus in the foregoing method designs. For example, the communications apparatus is a chip disposed in a communications device. For example, the communications device is a receiving device. For example, the receiving device is a terminal device or a network device. The communications apparatus includes: a memory, configured to store computer-executable program code; and a processor, where the processor is coupled to the memory. The program code stored in the memory includes instructions. When the processor executes the instructions, the eighth type of communications apparatus is enabled to perform the method in any one of the second aspect or the possible implementations of the second aspect.

The eighth type of communications apparatus may further include a communications interface. The communications interface may be a transceiver in the communications device, for example, implemented by using an antenna, a feeder, and a codec in the communications apparatus. Alternatively, if the eighth type of communications apparatus is the chip disposed in the communications device, the communications interface may be an input/output interface in the chip, for example, an input/output pin.

According to a twelfth aspect, a ninth type of communications apparatus is provided. The communications apparatus may be the third communications apparatus m the foregoing method designs. For example, the communications apparatus is a chip disposed in a communications device. For example, the communications device is a receiving device. For example, the receiving device is a terminal device or a network device. The communications apparatus includes: a memory, configured to store computer-executable program code; and a processor, where the processor is coupled to the memory. The program code stored in the memory includes instructions. When the processor executes the instructions, the ninth type of communications apparatus is enabled to perform the method in any one of the third aspect or the possible implementations of the third aspect.

The ninth type of communications apparatus may further include a communications interface. The communications interface may be a transceiver in the communications device, for example, implemented by using an antenna, a feeder, and a codec in the communications apparatus. Alternatively, if the ninth type of communications apparatus is the chip disposed in the communications device, the communications interface may be an input/output interface in the chip, for example, an input/output pin.

According to a thirteenth aspect, a computer storage medium is provided. The computer-readable storage medium stores instructions. When the instructions are run on a computer, the computer is enabled to perform the method in any one of the first aspect or the possible designs of the first aspect.

According to a fourteenth aspect, a computer storage medium is provided. The computer-readable storage medium stores instructions. When the instructions are run on a computer, the computer is enabled to perform the method in any one of the second aspect or the possible designs of the second aspect.

According to a fifteenth aspect, a computer storage medium is provided. The computer-readable storage medium stores instructions. When the instructions are run on a computer, the computer is enabled to perform the method in any one of the third aspect or the possible designs of the third aspect.

According to a sixteenth aspect, a computer program product including instructions is provided. The computer program product stores the instructions, and when the computer program product is run on a computer, the computer is enabled to perform the method in any one of the first aspect or the possible designs of the first aspect.

According to a seventeenth aspect, a computer program product including instructions is provided. The computer program product stores the instructions, and when the computer program product is run on a computer, the computer is enabled to perform the method in any one of the second aspect or the possible designs of the second aspect.

According to an eighteenth aspect, a computer program product including instructions is provided. The computer program product stores the instructions, and when the computer program product is run on a computer, the computer is enabled to perform the method in any one of the third aspect or the possible designs of the third aspect.

In the embodiments of this application, expiration of the reordering timer during re-establishment of the PDCP layer can be avoided as much as possible. If the reordering timer is stopped from running rather than expires, the PDCP layer does not deliver a previously received out-of-order data packet to the upper layer, and does not update a value of RX_DELIV. As the value of RX_DELIV is not updated, a valid time window does not change. Therefore, after the PDCP layer re-establishment is completed, if the PDCP layer receives a data packet, the PDCP layer may further perform determining based on the original valid time window. If the newly received data packet is a data packet that is not received by the receiving device before handover or reselection, the PDCP layer may also identify the data packet and may order the received data packet and the data packet that is not delivered to the upper layer previously. In this way, a packet loss rate is reduced, and a probability that the PDCP layer delivers the out-of-order data packet to the upper layer is also reduced as much as possible.

DESCRIPTION OF EMBODIMENTS

Figure 1A:
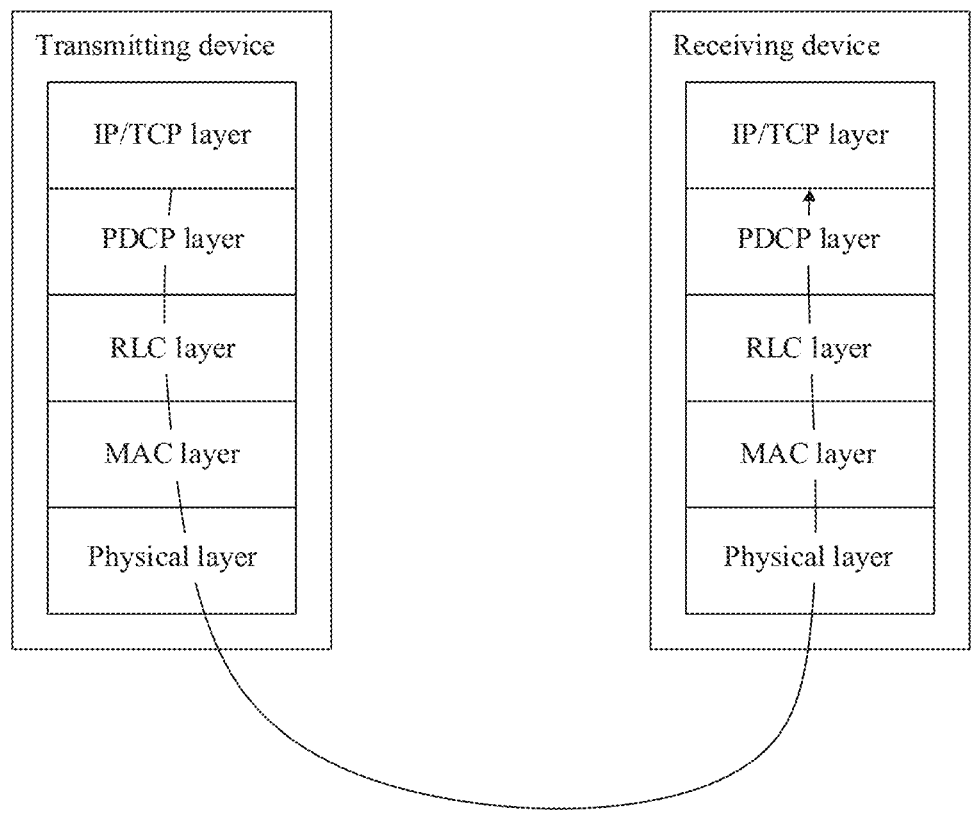
FIG. 1A is a schematic diagram of protocol stacks of a transmitting device and a receiving device according to an embodiment of this application.

To make the objectives, technical solutions, and advantages of the embodiments of this application clearer, the following further describes the embodiments of this application in detail with reference to the accompanying drawings.

In the following descriptions, some terms in the embodiments of this application are described, to facilitate understanding of a person skilled in the art.

(1) A terminal device includes a device that provides a voice and/or data connectivity for a user. Specifically, the terminal device includes a device that provides a voice for a user, or includes a device that provides data connectivity for a user, or includes a device that provides a voice and data connectivity for a user. For example, the terminal device may include a handheld device having a wireless connection function, or a processing device connected to a wireless modem. The terminal device may communicate with a core network through a radio access network (radio access network, RAN), and exchange a voice or data with the RAN, or exchange a voice and data with the RAN. The terminal device may include user equipment (user equipment, UE), a wireless terminal device, a mobile terminal device, a device-to-device (device-to-device, D2D) terminal device, a vehicle-to-everything (vehicle-to-everything, V2X) terminal device, a machine-to-machine/machine type communication (machine-to-machine/machine type communication. M2M/MTC) terminal device, an internet of things (internet of things, IoT) terminal device, a subscriber unit (subscriber unit), a subscriber station (subscriber station), a mobile station (mobile station), a remote station (remote station), an access point (access point, AP), a remote terminal (remote terminal), an access terminal (access terminal), a user terminal (user terminal), a user agent (user agent), a user device (user device), or the like. For example, the terminal device may include a mobile phone (or referred to as a "cellular" phone), a computer with a mobile terminal device, a portable, pocket-sized, handheld, or computer built-in mobile apparatus, or the like. For example, the terminal device is a device such as a personal communications service (personal communications service. PCS) phone, a cordless phone, a session initiation protocol (session initiation protocol, SIP) phone, a wireless local loop (wireless local loop, WLL) station, or a personal digital assistant (personal digital assistant, PDA). The terminal device alternatively includes a limited device, for example, a device having relatively low power consumption, a device having a limited storage capability, or a device having a limited computing capability. For example, the terminal device includes an information sensing device such as a barcode, radio frequency identification (radio frequency identification, RFID), a sensor, a global positioning system (global positioning system, GPS), or a laser scanner.

By way of example but not limitation, the terminal device in the embodiments of this application may alternatively be a wearable device. The wearable device may also be referred to as a wearable intelligent device, an intelligent wearable device, or the like, and is a generic term for wearable devices that are developed by applying wearable technologies to intelligently design daily wear, such as glasses, gloves, watches, clothes, and shoes. The wearable device is a portable device that is directly worn on a body or integrated into clothes or an accessory of a user. The wearable device is not only a hardware device, but also implements a powerful function through software support, data exchange, and cloud interaction. Generalized wearable intelligent devices include full-featured and large-size devices that can implement all or some functions without depending on smartphones, for example, smartwatches or smart glasses, and devices that focus on only one type of application function and need to work with other devices such as smartphones, for example, various smart bands, smart helmets, or smart jewelry for monitoring physical signs.

However, if the various terminal devices described above are located on a vehicle (for example, placed inside the vehicle or mounted inside the vehicle), the terminal devices may be considered as vehicle-mounted terminal devices. For example, the vehicle-mounted terminal devices are also referred to as on-board units (on-board unit. OBU).

In the embodiments of this application, the terminal device may alternatively include a relay (relay). Alternatively, it may be understood that any device that can perform data communication with a base station may be considered as a terminal device.

(2) A network device includes, for example, an access network (access network, AN) device such as a base station (for example, an access point), and may be a device that communicates with a wireless terminal device over an air interface through one or more cells in an access network. Alternatively, for example, a network device in a vehicle-to-everything (vehicle-to-everything, V2X) technology is a road side unit (road side unit, RSU). The base station may be configured to mutually convert a received over-the-air frame and an IP packet, and serve as a router between the terminal device and a remaining part of the access network. The remaining part of the access network may include an IP network. The RSU may be a fixed infrastructure entity supporting V2X applications, and may exchange a message with another entity supporting V2X applications. The network device may further coordinate attribute management of the air interface. For example, the network device may include an evolved NodeB (eNodeB or eNB or e-NodeB, evolved NodeB) in a long term evolution (long term evolution. LTE) system or a long term evolution-advanced (long term evolution-advanced, LTE-A) system, may include a next generation NodeB (next generation NodeB, gNB) in a 5th generation (5th generation, 5G) new radio (new radio. NR) system (also briefly referred to as an NR system), or may include a centralized unit (centralized unit, CU) and a distributed unit (distributed unit, DU) in a cloud radio access network (cloud radio access network. Cloud RAN) system. This is not limited in the embodiments of this application.

A receiving device in the embodiments of this application may be a terminal device, or may be a network device. Similarly, a transmitting device configured to send a data packet in the embodiments of this application may be a terminal device, or may be a network device. In addition, for example, in one case, the transmitting device is a network device, and the receiving device is a terminal device. Alternatively, in another case, both the transmitting device and the receiving device are network devices. Alternatively, in still another case, both the transmitting device and the receiving device are terminal devices. This is not specifically limited.

(3) PDCP layer re-establishment: PDCP layer re-establishment usually occurs during cell handover or cell change, and a transmitting entity and a receiving entity at a PDCP layer need to perform different actions. Herein, an action of the transmitting entity at the PDCP layer is not described, and an action of the receiving entity at the PDCP layer is mainly described. During the PDCP layer re-establishment, the receiving entity needs to:

process a PDCP protocol data unit (protocol data unit, PDU) delivered by a lower layer due to the PDCP layer re-establishment;

for a signaling radio bearer (signaling radio bearer, SRB), discard all stored service data units (service data unit, SDU) and PDUs;

for an SRB and an unacknowledged mode (UM) DRB, if a reordering timer is running;

stop and reset the reordering timer; and for a UM DRB, deliver all stored PDCP SDUs to an upper layer in order after decompressing the PDCP SDUs;

for an AM DRB, decompress all stored PDCP SDUs if drb-ContinueROHC is not configured;

for an AM DRB, reset a downlink header compression protocol and start with an NC state in a U-mode if drb-ContinueROHC is not configured, where the NC state in the U-mode is a compressed state:

for a UM DRB and a UM SRB, set a count value of a next expected data packet and a count value of the first unreceived data packet to initial values;

during the PDCP re-establishment, apply a ciphering algorithm and a key provided by the upper layer; and during the PDCP re-establishment, apply an integrity protection algorithm and a key provided by the upper layer.

(4) Data recovery at a PDCP layer (also briefly referred to as data recovery in the following description): Data recovery at the PDCP layer is behavior for an AM DRB, and usually occurs when cell handover or change is performed or when transmission on two links is changed to transmission on one link in uplink. A transmitting entity at the PDCP layer needs to perform data retransmission on a data packet that is not received before the change. A receiving entity at the PDCP layer does not need to perform any behavior.

(5) A cell change (cell change) generally refers to a case in which a cell in which a terminal device is located changes, and a change manner is not limited. For example, cases such as a change of a primary cell (primary cell. PCell) of the terminal device or a change of a secondary cell (second cell, SCell) of the terminal device are all cell changes.

(6) Terms "system" and "network" may be used interchangeably in the embodiments of this application. "At least one" refers to one or more, and "a plurality of" refers to two or more. The term "and/or" describes an association relationship between associated objects and represents that three relationships may exist. For example, A and/or B may represent the following cases: Only A exists, both A and B exist, and only B exists, where A and B may be singular or plural. The character "/" usually represents an "or" relationship between the associated objects. The term "at least one of the following items (pieces)" or an expression similar to the term indicates any combination of the items, and includes a single item (piece) or any combination of a plurality of items (pieces). For example, at least one of a, b, or c may indicate: a, b, c, a-b, a-c, b-c, or a-b-c, where a, b, and c may be singular or plural.

In addition, unless otherwise stated, ordinal numbers such as "first" and "second" mentioned in the embodiments of this application are intended to distinguish between a plurality of objects, but are not intended to limit a sequence, a time sequence, priorities, or importance levels of the plurality of objects. For example, a first synchronization signal and a second synchronization signal are merely intended to distinguish between different synchronization signals, but do not indicate that the two synchronization signals are different in content, a priority, a sending sequence, an importance level, or the like.

The foregoing describes some noun concepts in the embodiments of this application. The following describes technical features in the embodiments of this application.

FIG. 1A is a schematic diagram of some protocol stacks of a transmitting device and a receiving device. In FIG. 1A, the transmitting device and the receiving device each include a PDCP layer, an RLC layer, a MAC layer, and a physical layer (PHY). In addition, the transmitting dev ice and the receiving device each include an upper layer of the PDCP layer. In FIG. 1A, an example in which the upper layer of the PDCP layer is an IP/transmission control protocol (transmission control protocol. TCP) layer is used. When the transmitting device sends a data packet, a transmission sequence of the data packet is: IP/TCP layer→PDCP layer→RLC layer→MAC layer→physical layer. Then, the data packet is sent from the physical layer of the transmitting device to the physical layer of the receiving device. After the data packet arrives at the physical layer of the receiving device, a transmission sequence in the receiving device is: physical layer→MAC layer→RLC layer→PDCP layer→IP/TCP layer. A curved arrow in FIG. 1A is used to represent a transmission path of the data packet.

Figure 1B:
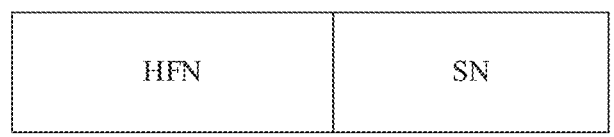
FIG. 1B is a schematic composition diagram of a count value of a data packet.

In transmission over an air interface, each data packet has a corresponding number. A number of a data packet may include two parts: a sequence number (sequence number, SN) and a hyper frame number (hyper frame number, HFN). A combination of the two parts forms the number of the data packet, that is, a count (count) value of the data packet. The PDCP layer of the transmitting device adds an SN to a to-be-sent data packet. In addition, the transmitting device and the receiving device further need to maintain a same HFN. A sum of the SN and the HFN forms the count value of the data packet. The count value of the data packet may also be referred to as the number of the data packet, or the like. A name of the feature is not limited in the embodiments of this application. FIG. 1B is a schematic composition diagram of a count value of a data packet.

The transmitting device needs to maintain that a total quantity of sent SNs does not exceed half of a total quantity of SNs, to avoid frame number confusion. Similarly, the receiving device also uses a length of half of the total quantity of SNs as a receive window. The total quantity of SNs is a quantity of all values corresponding to a quantity of bits (bit) occupied by the SNs. For example, if the quantity of bits of the SNs is 3, because the three bits correspond to eight values in total, the total quantity of SNs is 8. In this case, the transmitting device needs to ensure that the total quantity of sent SNs is less than or equal to 4. The sent SN herein may be understood as an SN corresponding to a data packet that remains in a sent state. The sent state means that the transmitting device has sent the data packet, but does not receive a response message (for example, an acknowledgement (ACK)/a negative acknowledgement (NACK)) that is fed back by the receiving device for the data packet. For example, if the transmitting device sends a data packet 0, a data packet 1, a data packet 2, and a data packet 3, but does not receive, for each of the four data packets, a response message fed back by the receiving device, the transmitting device cannot send another data packet. Subsequently, for example, if the transmitting device receives an ACK of the receiving device for the data packet 0, the transmitting device may send another data packet, for example, may send a data packet 4.

In transmission over an air interface, although the transmitting device sequentially sends data packets based on numbers of the data packets, because the medium access control (medium access control, MAC) layer supports a hybrid automatic repeat request (hybrid automatic repeat request, HARQ) mechanism, data packets received by the receiving device may be out of order due to parallel running of a plurality of HARQ processes. For an AM, the radio link control (radio link control. RLC) layer supports an automatic repeat request (automatic repeat request. ARQ) mechanism. This also causes a result that data packets received by the receiving device are out of order.

In an LTE system. RLC in a layer 2 protocol stack in the receiving device is responsible for reordering received out-of-order data packets, and delivering the reordered data packets to an upper layer, that is, the PDCP layer, of the RLC layer. In a 5G NR system, RLC in the layer 2 protocol stack no longer has a reordering function, and PDCP (or referred to as the PDCP layer) in the layer 2 protocol stack m the receiving device is responsible for reordering received out-of-order data packets.

After receiving a data packet, the PDCP layer of the receiving device first determines a count value of the data packet based on an SN carried in the data packet and an HFN maintained by the receiving device, where the count value of the data packet is represented by, for example, RCVD_COUNT. Then, the PDCP layer determines whether the count value of the data packet is within a valid receive window, that is, determines whether the count value of the data packet is greater than or equal to RX_DELIV and less than RX_DELIV+total quantity of SNs/2. RX_DELIV indicates a number of the 1st data packet that is not delivered by the PDCP layer to an upper layer previously. If it is determined that the count value of the data packet is greater than or equal to RX_DELIV and less than RX_DELIV+total quantity of SNs/2, it is determined that the count value of the data packet is within the valid time window, and the PDCP layer may temporarily store the data packet. Alternatively, if it is determined that the count value of the data packet is less than RX_DELIV, or it is determined that the count value of the data packet is less than RX_DELIV+total quantity of SNs/2, or it is determined that the count value of the data packet is less than both RX_DELIV and RX_DELIV+total quantity of SNs/2, it is determined that the count value of the data packet is not within the valid time window, and the PDCP layer may discard the data packet. The PDCP layer may order or reorder temporarily stored data packets.

That the PDCP layer orders the data packets roughly relates to four variables:

RCVD_COUNT: indicating a count value of a currently received data packet.

RX_DELIV: indicating a count value of the 1st data packet that is not delivered by the PDCP layer to the upper layer of the PDCP layer, where the 1st data packet that is not delivered to the upper layer of the PDCP layer may be understood as a data packet with a smallest count value in data packets that are not delivered by the PDCP layer to the upper layer.

RX_NEXT: indicating a count value of a next to-be-received data packet that is currently expected, that is, indicating a value obtained by adding 1 to a largest count value in count values of currently received data packets.

RX_REORD: indicating a value, of RX_NEXT, existing when a reordering timer (t-reordering timer) is started.

Figure 2:
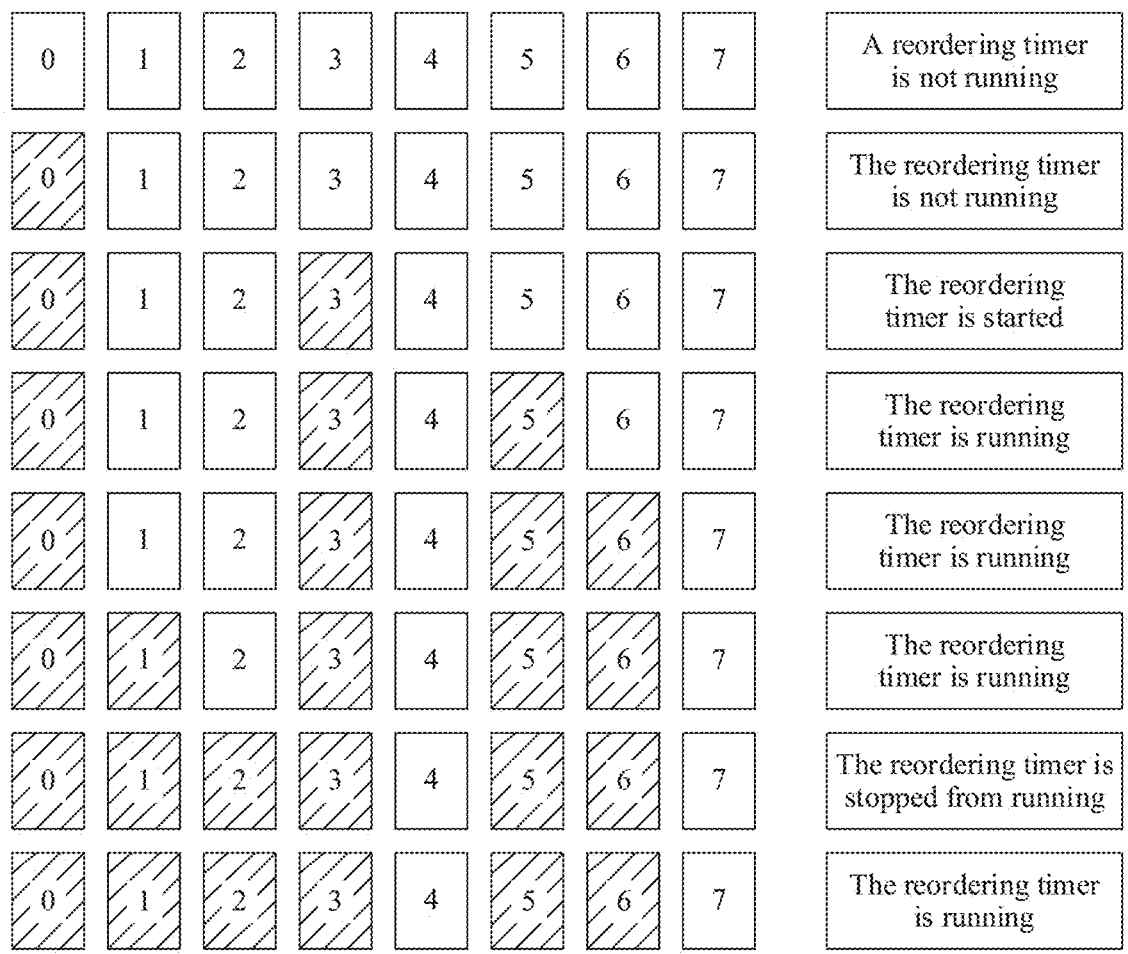
FIG. 2 is an example in which a PDCP layer receives data packets and orders the data packets.

The following uses FIG. 2 as an example to describe how a PDCP layer orders data packets.

The first row in FIG. 2 indicates that a PDCP layer at a receive end does not receive any data packet. In this case, neither a value of RCVD_COUNT nor a value of RX_RE-ORD exists. A value of RX_DELIV is 0, which indicates that a count value of the current 1st data packet that is not delivered to an upper layer of the PDCP layer is 0. A value of RX_NEXT is 0, which indicates that a count value of a next to-be-received data packet that is currently expected is 0, that is, the next to-be-received data packet that is currently expected is a data packet 0.

The second row in FIG. 2 indicates that the PDCP layer receives the data packet 0. The PDCP layer determines whether a count value of the data packet 0 is within a valid time window. The PDCP layer may determine, based on a non-updated value of RX_DELIV, whether the count value of the data packet 0 is within the valid time window. For example, the PDCP layer determines that the count value of the data packet 0 is within the valid time window, and the PDCP layer temporarily stores the data packet 0. Then, the PDCP layer determines whether RCVD_COUNT is greater than or equal to RX_NEXT. If RCVD_COUNT is greater than or equal to RX_NEXT, RX_NEXT needs to be updated. In this case, the value of RCVD_COUNT is 0, a non-updated value of RX_NEXT is 0, and RCVD_COUNT is equal to RX_NEXT. Therefore, the value of RX_NEXT is updated to RCVD_COUNT+1. In other words, the value of RX_NEXT is updated to 1. Because the data packet 0 is received, and 0 is equal to the count value of the 1st data packet that is not delivered to the upper layer, the PDCP layer delivers the data packet 0 to the upper layer. In this case, the count value of the 1st data packet that is not delivered to the upper layer is changed to 1, and RX_DELIV is updated to 1. In addition, when a reordering timer is not running, the PDCP layer may further determine whether RX_DELIV is greater than or equal to RX_NEXT. If RX_DELIV is less than RX_NEXT, it indicates that received data packets are out of order. In this case, both the value of RX_DELIV and the value of RX_NEXT are 1. Therefore, it may be determined that out-of-order does not exist. When FIG. 2 is described, an example in which the upper layer of the PDCP layer is an IP/TCP layer is used.

The third row in FIG. 2 indicates that the PDCP layer receives a data packet 3. The PDCP layer determines whether a count value of the data packet 3 is within the valid time window. The PDCP layer may determine, based on a non-updated value of RX_DELIV, whether the count value of the data packet 3 is within the valid time window. For example, the PDCP layer determines that the count value of the data packet 3 is within the valid time window, and the PDCP layer temporarily stores the data packet 3. Then, the PDCP layer determines whether RCVD_COUNT is greater than or equal to RX_NEXT. If RCVD_COUNT is greater than or equal to RX_NEXT, RX_NEXT needs to be updated. In this case, the value of RCVD_COUNT is 3, a non-updated value of RX_NEXT is 1, and RCVD_COUNT is greater than RX_NEXT. Therefore, the PDCP layer may update the value of RX_NEXT to RCVD_COUNT+1. In other words, the value of RX_NEXT is updated to 4. In this case, if an out-of-order delivery (out-of-order delivery) function is configured for the PDCP layer, the PDCP layer may also deliver the data packet 3 to the upper layer. In this case, the PDCP layer may not order the data packet. Alternatively, if an out-of-order delivery function is not configured for the PDCP layer, because a data packet 1 is not received, the value of RX_DELIV is still 1, and the PDCP layer does not need to deliver the data packet to the upper layer. In addition, when the reordering timer is not running, the PDCP layer may further determine whether RX_DELIV is greater than or equal to RX_NEXT. If RX_DELIV is less than RX_NEXT, it indicates that received data packets are out of order. Because RX_DELIV=1 is less than RX_NEXT=4, the PDCP layer may start the reordering timer and update the value of RX_REORD to 4. Therefore, when the reordering timer is running, it indicates that out-of-order exists. This specification mainly describes a case in which the out-of-order delivery function is not configured for the PDCP layer.

The fourth row in FIG. 2 indicates that the PDCP layer receives a data packet 5. The PDCP layer determines whether a count value of the data packet 5 is within the valid time window. The PDCP layer may determine, based on a non-updated value of RX_DELIV (to be specific, the value of RX_DELIV is 1), whether the count value of the data packet 5 is within the valid time window. For example, the PDCP layer determines that the count value of the data packet 5 is within the valid time window, and the PDCP layer temporarily stores the data packet 5. Then, the PDCP layer determines whether RCVD_COUNT is greater than or equal to RX_NEXT. If RCVD_COUNT is greater than or equal to RX_NEXT, RX_NEXT needs to be updated. In this case, the value of RCVD_COUNT is 5, a non-updated value of RX_NEXT is 4, and RCVD_COUNT is greater than RX_NEXT. Therefore, the PDCP layer may update the value of RX_NEXT to RCVD_COUNT+1. In other words, the value of RX_NEXT is updated to 6. In this case, because the data packet 1 is not received, the value of RX_DELIV is still 1, and no data packet is delivered to the upper layer. In addition, when the reordering timer of the PDCP layer is running, if RX_DELIV is greater than or equal to RX_RE-ORD, it indicates that data packets whose numbers are less than RX_REORD and that have not been received when the reordering timer is started have been received. In this case, the reordering timer is running, but RX_DELIV=1 is less than RX_REORD=4. This indicates that data packets that are missing when the reordering timer is started are not completely received.

The fifth row in FIG. 2 indicates that the PDCP layer receives a data packet 6. The PDCP layer determines whether a count value of the data packet 6 is within the valid time window. The PDCP layer may determine, based on a non-updated value of RX_DELIV (to be specific, the value of RX_DELIV is 1), whether the count value of the data packet 6 is within the valid time window. For example, the PDCP layer determines that the count value of the data packet 6 is within the valid time window, and the PDCP layer temporarily stores the data packet 6. Then, the PDCP layer determines whether RCVD_COUNT is greater than or equal to RX_NEXT. If RCVD_COUNT is greater than or equal to RX_NEXT, RX_NEXT needs to be updated. In this case, the value of RCVD_COUNT is 6, a non-updated value of RX_NEXT is 6, and RCVD_COUNT is equal to RX_NEXT. Therefore, the PDCP layer may update the value of RX_NEXT to RCVD_COUNT+1. In other words, the value of RX_NEXT is updated to 7. In this case, because the data packet 1 is not received, the value of RX_DELIV is still 1, and no packet is delivered to the upper layer. In addition, when the reordering timer of the PDCP layer is running, if RX_DELIV is greater than or equal to RX_REORD, it indicates that data packets whose numbers are less than RX_REORD and that have not been received when the reordering timer is started have been received. In this case, the reordering timer is running, but RX_DELIV=1 is less than RX_REORD=4. This indicates that the data packets that are missing when the reordering timer is started are not completely received. To be specific, the started reordering timer is used to wait to receive the data packet 1 and a data packet 2. In this case, if the reordering timer does not expire, the reordering timer is not stopped and the reordering timer continues to run.

The sixth row in FIG. 2 indicates that the PDCP layer receives the data packet 1. The PDCP layer determines whether a count value of the data packet 1 is within the valid time window. The PDCP layer may determine, based on a non-updated value of RX_DELIV (to be specific, the value of RX_DELIV is 1), whether the count value of the data packet 1 is within the valid time window. For example, the PDCP layer determines that the count value of the data packet 1 is within the valid time window, and the PDCP layer temporarily stores the data packet 1. Then, the PDCP layer determines whether RCVD_COUNT is greater than or equal to RX_NEXT. If RCVD_COUNT is greater than or equal to RX_NEXT, RX_NEXT needs to be updated. In this case, the value of RCVD_COUNT is 1, a non-updated value of RX_NEXT is 7, and RCVD_COUNT is less than RX_NEXT. Therefore, the value of RX_NEXT does not need to be updated, and the value of RX_NEXT is still 7. In this case, because the received data packet is 1, which is equal to the value RX_DELIV of the first unreceived data packet, the packet 1 is delivered to the upper layer, and RX_DELIV is updated to 2. In addition, when the reordering timer of the PDCP layer is running, if RX_DELIV is greater than or equal to RX_REORD, it indicates that data packets whose numbers are less than RX_REORD and that have not been received when the reordering inner is started have been received. In this case, the reordering timer is running, but RX_DELIV=2 is less than RX_REORD=4. This indicates that the data packets that are missing when the reordering timer is started are not completely received. To be specific, the started reordering timer is used to wait to receive the data packet 1 and the data packet 2. In this case, only the data packet 1 is received. If the reordering timer does not expire, the reordering timer is not stopped and the reordering timer continues to run.

The seventh row in FIG. 2 indicates that the PDCP layer receives the data packet 2. The PDCP layer determines whether a count value of the data packet 2 is within the valid time window. The PDCP layer may determine, based on a non-updated value of RX_DELIV (to be specific, the value of RX_DELIV is 2), whether the count value of the data packet t is within the valid time window. For example, the PDCP layer determines that the count value of the data packet 2 is within the valid time window, and the PDCP layer temporarily stores the data packet 2. Then, the PDCP layer determines whether RCVD_COUNT is greater than or equal to RX_NEXT. If RCVD_COUNT is greater than or equal to RX_NEXT, RX_NEXT needs to be updated. In this case, the value of RCVD_COUNT is 2, a non-updated value of RX_NEXT is 7, and RCVD_COUNT is less than RX_NEXT. Therefore, the value of RX_NEXT does not need to be updated, and the value of RX_NEXT is still 7. In this case, because the received data packet is 2, which is equal to the value RX_DELIV of the first unreceived data packet, the packet 2 and the packet 3 following the packet 2 are delivered to the upper layer, and the first undelivered data packet is updated to an unreceived packet 4. In other words, RX_DELIV is updated to 4. In addition, when the reordering timer of the PDCP layer is running, if RX_DELIV is greater than or equal to RX_REORD, it indicates that data packets whose numbers are less than RX_REORD and that have not been received when the reordering timer is started have been received. In this case, the reordering timer is running, but RX_DELIV=4 is equal to RX_REORD=4. This indicates that the data packets that are missing when the reordering timer is started are completely received. In this case, the reordering timer is stopped and reset. In the eighth row in FIG. 2, because the reordering timer is not running, the PDCP layer may further determine whether RX_DELIV is greater than or equal to RX_NEXT. If RX_DELIV is less than RX_NEXT, it indicates that received data packets are out of order. Because RX_DELIV=4 is less than RX_NEXT=7, the PDCP layer may start the reordering timer and update the value of RX_REORD to 7. In this case, the started reordering timer is used to wait to receive the data packet 4. Values of other variables are consistent with those in the seventh row in FIG. 2.

FIG. 2 uses an example in which the PDCP layer receives the data packet 1 and the data packet 2 within a running time period of the reordering timer. Alternatively, if the reordering timer expires before the PDCP layer receives the data packet 1 and the data packet 2, the PDCP layer directly delivers the data packet 3 to the upper layer and updates the value of RX_DELIV. It is considered that the data packet 1 and the data packet 2 are lost. If the data packet 1 is subsequently received, because the PDCP layer has updated the value of RX_DELIV, the count value of the subsequently received data packet 1 may not be within the valid time window, and the PDCP layer discards the data packet 1. This also applies to the data packet 2. It can be learned that, because the reordering timer expires, a data packet may be lost at the PDCP layer.

A receiving process of a subsequent data packet may be deduced by analogy.

Currently, if a terminal device is to perform cell handover or cell change between cells provided by different network devices, the terminal device needs to perform re-establishment or data recovery on a PDCP layer of the terminal device, to adapt to a new network device. However, currently, it is specified that when the terminal device performs handover or change between two network devices, the two network devices consistently maintain data packets of an AM DRB. For example, a source network device of the terminal device is a network device 1, the terminal device receives a data packet 1, a data packet 3, and a data packet 4 from the network device 1, and then the terminal device performs cell handover. A target network device is a network device 2, and data packets that have not been received by the terminal device are a data packet 2, a data packet 5, and a data packet 6. In this case, the network device 1 sends the data packet 2, the data packet 5, and the data packet 6 to the network device 2, so that the network device 2 sends the data packet 2, the data packet 5, and the data packet 6 to the terminal device after the terminal device is handed over. Alternatively, the network device sends all of the data packet 1 to the data packet 6 to the network device 2, and the network device 2 may send all of the data packet 1 to the data packet 6 to the terminal device after the terminal device is handed over. Alternatively, the network device sends all of the data packet 1 to the data packet 6 to the network device 2, and the terminal device may send a status report to the network device 2 after the terminal device is handed over, to report information about the data packets received by the terminal device. Then, the network device 2 may send, to the terminal device based on the status report of the terminal device, the data packet 2, the data packet 5, and the data packet 6 that are not received by the terminal device. Therefore, currently, it is also specified that in a process in which the terminal device performs cell handover or change, data packet consistency needs to be maintained. This may be understood as that a count value of a data packet received by the terminal device before cell handover or reselection and a count value of a data packet received by the terminal device after cell handover or change should be consecutive.

Figure 3:
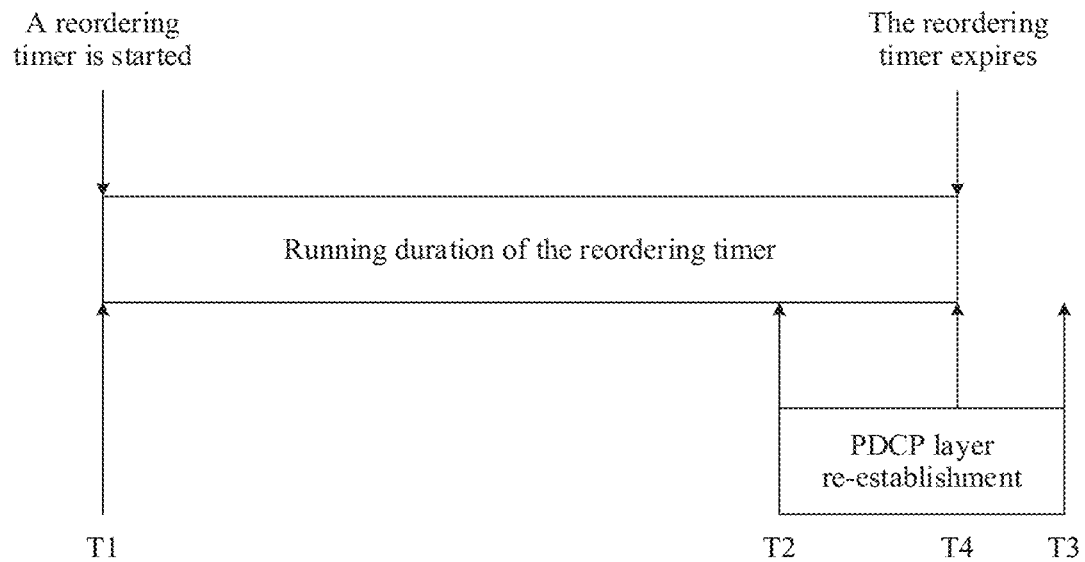
FIG. 3 is a schematic diagram in which a reordering timer expires during PDCP layer re-establishment.

In a PDCP layer re-establishment or data recovery process of the AM DRB, the terminal device does not receive a data packet, and neither an old network device nor the new network device sends a data packet to the terminal device. Only after the handover or the change of the terminal device is completed (duration of the handover or the change is greater than or equal to duration of the PDCP layer re-establishment process or the data recovery process), the new network device continues to send a data packet to the terminal device. However, during PDCP layer re-establishment, if the PDCP layer of the terminal device has started a reordering timer, the reordering timer may expire in the PDCP layer re-establishment process. For example, referring to FIG. 3, the reordering timer at the PDCP layer of the terminal device starts to run from a moment T1, and based on total timing duration of the reordering timer, the reordering timer should expire at a moment T4. However, at a moment T2 before the moment T4, the terminal device starts to re-establish the PDCP layer, and re-establishment of the PDCP layer is completed at a moment T3. The moment T4 is between the moment T2 and the moment T3. Therefore, the reordering timer expires in the PDCP layer re-establishment process. In a current processing manner, the terminal device delivers, to an upper layer, all out-of-order data packets received before the reordering timer expires, and updates a value of RX_DELIV. After the handover or reselection of the terminal device is completed, the new network device continues to send a data packet to the terminal device. After receiving the data packet, the PDCP layer of the terminal device determines whether a count value of the data packet is within a valid receive window. Because the value of RX_DELIV has been updated, the count value of the newly received data packet may not be within the valid receive window. In this case, the terminal device discards the newly received data packet. However, because the value of RX_DELIV is abnormally updated, the newly received data packet is probably a data packet that is not received by the terminal device before the handover or reselection.

It can be learned that a data packet may be lost due to PDCP re-establishment currently.

In the embodiments of this application, when a receiving device performs re-establishment or data recovery on a PDCP layer of the receiving device, if a reordering timer is in a running state, the PDCP layer may stop running of the reordering timer. In this manner, it can be avoided as much as possible that the reordering timer expires in a PDCP layer re-establishment process. In the embodiments of this application, the PDCP layer stops running of the reordering timer, but the reordering timer does not expire. Therefore, the PDCP layer does not deliver a previously received out-of-order data packet to an upper layer, and does not update a value of RX_DELIV. As the value of RX_DELIV is not updated, a valid time window does not change. Therefore, after the PDCP layer re-establishment is completed, if the PDCP layer receives a data packet, the PDCP layer may further perform determining based on the original valid time window. If the newly received data packet is a data packet that is not received by the receiving device before handover or reselection, the PDCP layer may also identify the data packet and may order the received data packet and the data packet that is not delivered to the upper layer previously. In this way, a packet loss rate is reduced, and a probability that the PDCP layer delivers the out-of-order data packet to the upper layer is also reduced as much as possible.

The technical solutions provided in the embodiments of this application may be applied to an NR system, for example, may be applied to a common NR system or the internet of vehicles, such as vehicle-to-everything (vehicle-to-everything, V2X) or NR-V; or may be applied to another similar communications system or a next-generation communications system.

Figure 4:
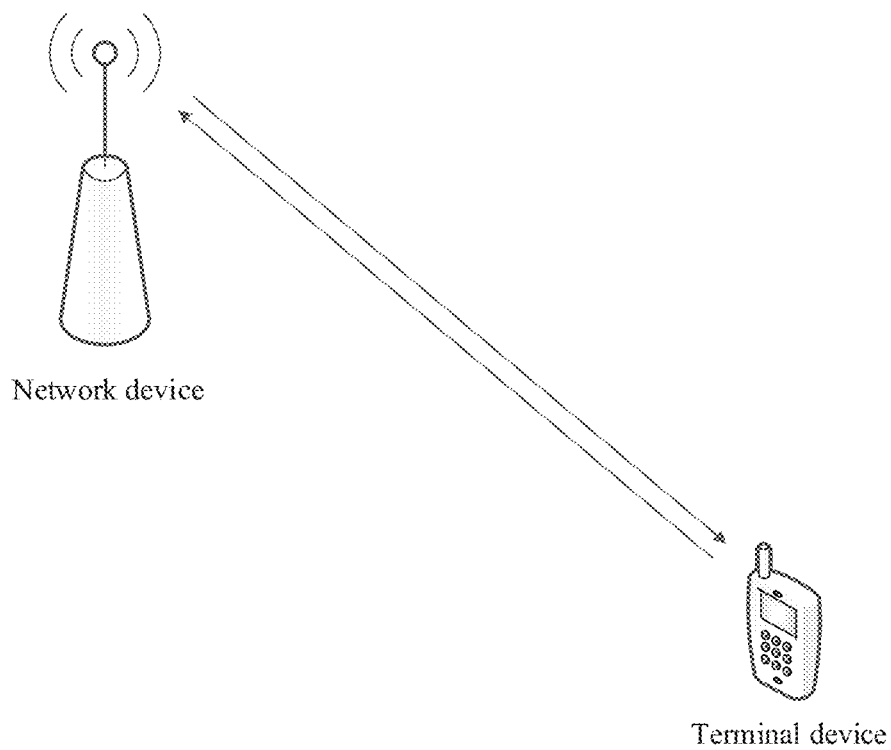
FIG. 4 is a schematic diagram of an application scenario according to an embodiment of this application.

FIG. 4 shows an application scenario according to an embodiment of this application. FIG. 4 includes one network device and one terminal device. For example, the network device works in an evolved universal mobile telecommunications system terrestrial radio access (evolved UMTS terrestrial radio access, E-UTRA) system, or works in an NR system. Certainly, in the embodiments of this application, one network device may serve a plurality of terminal devices. FIG. 4 uses only one terminal device as an example.

The network device in FIG. 4 is, for example, a base station. The network device corresponds to different devices in different systems, and for example, may correspond to an eNB in a 4G system, and correspond to a 5G network device such as a gNB in a 5G system. In FIG. 4, an example in which the network device is a base station is used. Actually, with reference to the foregoing description, the network device may alternatively be a device such as an RSU.

In addition, the embodiments of this application are not limited to communication between the network device and the terminal device. Alternatively, communication between network devices or communication between terminal devices may be used. For example, the transmitting device in the embodiments of this application may be a network device or a terminal device, the receiving device in the embodiments of this application may be a network device or a terminal device, and a combination of a type of the transmitting device and a type of the receiving device is not limited.

In the following description process of the embodiments of this application, unless otherwise specified, the "upper layer" is an upper layer of a PDCP layer.

Figure 5:
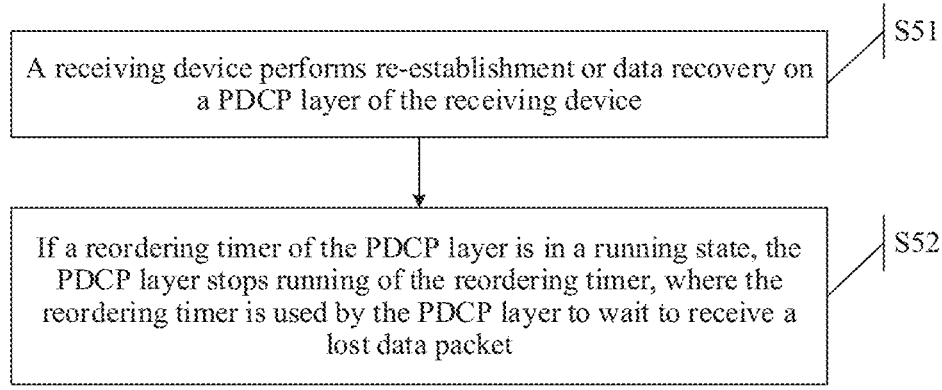
FIG. 5 is a flowchart of a first timer control method according to an embodiment of this application.

An embodiment of this application provides a first timer control method. FIG. 5 is a flowchart of the method. In the following description process, an example in which the method is applied to a network architecture shown in FIG. 4 is used. In addition, the method may be performed by a communications apparatus. The communications apparatus is, for example, a first communications apparatus, and the first communications apparatus can implement a function of a receiving device. The first communications apparatus may be a network device or a communications apparatus that can support a function required by a network device to implement the method. Alternatively, the first communications apparatus may be a terminal device or a communications apparatus that can support a function required by a terminal device to implement the method. Certainly, the first communications apparatus may alternatively be another communications apparatus, for example, a chip system.

For ease of description, an example in which the first communications apparatus is a receiving device is used below. If this embodiment is applied to the network architecture shown in FIG. 4, the following receiving device used to perform the embodiment shown in FIG. 5 may be the network device or the terminal device in the network architecture shown in FIG. 4. In addition, the following process may be further related to a transmitting device corresponding to the receiving device. Similarly, the transmitting device may be a network device or a communications apparatus that can support a function required by a network device to implement the method. Alternatively, the transmitting device may be a terminal device or a communications apparatus that can support a function required by a terminal device to implement the method. Certainly, a function of the transmitting device may be alternatively implemented by using another communications apparatus, for example, a chip system. If the network architecture shown in FIG. 4 is used as an example, for example, the network device in the network architecture shown in FIG. 4 is the receiving device described in this specification, and the terminal device in the network architecture shown in FIG. 4 is the transmitting device described in this specification, or the network device in the network architecture shown in FIG. 4 is the transmitting device described in this specification, and the terminal device in the network architecture shown in FIG. 4 is the receiving device described in this specification. In a process of describing the embodiment shown in FIG. 5, an example in which the receiving device is the terminal device and the transmitting device is the network device is used in most cases.

S51: The receiving device performs re-establishment or data recovery on a PDCP layer of the receiving device.

For example, the terminal device needs to perform cell handover or cell change, and a cell from which the terminal device is handed over or changed and a cell that the terminal device is to access after the handover or change are cells provided by different network devices. In other words, the terminal device needs to perform cell handover or cell change between the cells provided by the different network devices. In this case, the terminal device needs to re-establish a PDCP layer of the terminal device, to update information such as a key used to encrypt data, so as to adapt to a new network device.

For re-establishment of the PDCP layer, refer to the foregoing description.

In addition, for an AM, a MAC layer supports a HARQ mechanism. Data packets received by the receiving device may be out of order due to parallel running of a plurality of HARQ processes. An RLC layer supports an ARQ mechanism. This may also cause a result that received data packets are out of order. Therefore, in this embodiment of this application, the re-establishment of the PDCP layer may be PDCP layer re-establishment for an AM data radio bearer (data radio bearer, DRB), or the data recovery of the PDCP layer may be PDCP layer data recovery for an AM DRB.

S52: If a reordering timer of the PDCP layer is in a running state, the PDCP layer stops running of the reordering timer, where the reordering timer is used by the PDCP layer to wait to receive a lost data packet.

For a function of the reordering timer, refer to the foregoing description for FIG. 2. The third row in FIG. 2 is used as an example. The PDCP layer receives the data packet 0 and the data packet 3, but does not receive the data packet 1 or the data packet 2. Therefore, the PDCP layer starts the reordering timer, and the reordering timer is used to wait to receive the data packet 1 and the data packet 2. Therefore, the reordering timer is used to wait to receive the lost data packet. Herein. "lost" may be understood as "not received temporarily" but not "completely lost" ("completely lost" may be understood as that the data packet is considered lost, and even if the data packet is subsequently received, the data packet may be discarded because a count value of the data packet is not within a valid time window).

When the receiving device performs re-establishment or data recovery on the PDCP layer of the receiving device, if the reordering timer is in a running state, the PDCP layer may stop running of the reordering timer. In this manner, it can be avoided as much as possible that the reordering timer expires in a PDCP layer re-establishment process. If the reordering timer is stopped from running rather than expires, the PDCP layer does not deliver a previously received out-of-order data packet to an upper layer, that is, does not deliver, to the upper layer of the PDCP layer, a data packet whose count value is greater than a count value of the 1st data packet that is not received by the PDCP layer, and does not update a value of RX_DELIV. As the value of RX_DELIV is not updated, a valid time window does not change. Therefore, after the PDCP layer re-establishment is completed, if the PDCP layer receives a data packet, the PDCP layer may further perform determining based on the original valid time window. If the newly received data packet is a data packet that is not received by the receiving device before handover or reselection, the PDCP layer may also identify the data packet and may order the received data packet and the data packet that is not delivered to the upper layer previously. In this way, a packet loss rate is reduced, and a probability that the PDCP layer delivers the out-of-order data packet to the upper layer is also reduced as much as possible. This ensures as much as possible that all data packets received by the upper layer are in order.

In this embodiment of this application, in addition to stopping running of the reordering timer, the PDCP layer may further reset the reordering timer. The "reset" means that the reordering timer is enabled to start timing again. The reordering timer may start timing from maximum duration in a decreasing manner, and a decreasing step is, for example, 1 or another value. For example, if the maximum duration of the reordering timer is 50, resetting the reordering timer is to enable the reordering timer to start timing again from 50 in a decreasing manner. Alternatively, the reordering timer may start timing from 0 in an increasing manner, and an increasing step is, for example, 1 or another value. If it is specified that the reordering timer starts timing from 0. "resetting" may also be expressed as "clearing".

In addition, in an optional implementation, there may be a corresponding prerequisite for performing S52.

In an implementation of the prerequisite, the prerequisite is that total duration of the reordering timer is less than a first threshold, and/or remaining running duration of the reordering timer is less than a second threshold. Specifically, the prerequisite may be that the total duration of the reordering timer is less than the first threshold or the remaining running duration of the reordering timer is less than the second threshold; or the total duration of the reordering timer is less than the first threshold and the remaining running duration of the reordering timer is less than the second threshold.

If the total duration of the reordering timer is less than the first threshold, it indicates that the total duration of the reordering timer may be relatively short. In this case, when the receiving device performs re-establishment or data recovery on the PDCP layer of the receiving device, if the reordering timer is in a running state, because the total duration of the reordering timer is relatively short, the reordering timer is likely to expire during re-establishment of the PDCP layer. Likewise, in a case in which the remaining running duration of the reordering timer is less than the second threshold, when the receiving device performs re-establishment or data recovery on the PDCP layer of the receiving device, if the reordering timer is in a running state, because the remaining running duration of the reordering timer is relatively short, the reordering timer is likely to expire during re-establishment of the PDCP layer. Therefore, on this premise, the technical solutions provided in this embodiment of this application may be applied as much as possible to a case in which a probability that the reordering timer expires during re-establishment of the PDCP layer is relatively high, so that the technical solutions in this embodiment of this application are more pertinently applied. The first threshold may be set by the receiving device, may be preconfigured in the receiving device, may be notified by the transmitting device to the receiving device in advance, or may be specified in a protocol. This is not specifically limited. Likewise, the second threshold may be set by the receiving device, may be preconfigured in the receiving device, may be notified by the transmitting device to the receiving device in advance, or may be specified in a protocol. This is not specifically limited.

Alternatively, in another implementation of the prerequisite, the prerequisite is that a time interval used to determine service interruption is greater than or equal to a third threshold, where when a time interval at which the PDCP layer delivers data packets to the upper layer of the PDCP layer twice is greater than or equal to the time interval used to determine service interruption, the upper layer of the PDCP layer determines that service interruption occurs. For example, the time interval used to determine service interruption is referred to as a first time interval.

According to the foregoing description, after receiving a data packet, the PDCP layer delivers an in-order data packet to the upper layer, and delivers an out-of-order data packet to the upper layer after ordering is completed or when the reordering timer expires. In this case, the upper layer, such as an IP/TCP layer, of the PDCP layer usually determines a service continuity status based on a time interval at which data packets are received twice. For example, the first time interval is preconfigured, or may be specified in a protocol. If the upper layer of the PDCP layer determines that the time interval at which the data packets delivered by the PDCP layer are received twice is greater than or equal to the first time interval, the upper layer of the PDCP layer determines that service interruption occurs, and then the upper layer of the PDCP layer may re-initiate a service request. If the upper layer of the PDCP layer re-initiates the service request, discontinuity actually occurs for a user. This affects user experience and causes transmission quality deterioration.

However, in the technical solutions provided in this embodiment of this application, running of the reordering timer is stopped, and when running of the reordering timer is stopped, the previous out-of-order data packet is not delivered to the upper layer. Therefore, the upper layer may not receive, within a relatively long time period, a data packet delivered by the PDCP layer. In this case, if the time interval used to determine service interruption is relatively short, the upper layer may consider that service interruption occurs, and re-initiate the service request. Therefore, an application prerequisite of this embodiment of this application may be that the first time interval is greater than or equal to the third threshold. If the first time interval is greater than or equal to the third threshold, it indicates that the time interval used to determine service interruption is relatively long. In this case, even if the PDCP layer does not deliver a data packet to the upper layer within a relatively long time period, the upper layer may not consider that service interruption occurs. Therefore, in this scenario, the technical solutions in this embodiment of this application are applicable. The first time interval may be set by the receiving device, may be preconfigured in the receiving device, may be notified by the transmitting device to the receiving device in advance, or may be specified in a protocol. This is not specifically limited. The third threshold may be set by the receiving device, may be preconfigured in the receiving device, may be notified by the transmitting device to the receiving device in advance, or may be specified in a protocol. This is not specifically limited.

In addition, that the first time interval is greater than or equal to the third threshold may be determined by the PDCP layer, or may be determined by the upper layer of the PDCP layer. If the upper layer determines that the first time interval is greater than or equal to the third threshold, the upper layer may notify the PDCP layer of a determining result, so that the PDCP layer determines whether to stop running of the reordering timer.

The foregoing two prerequisites for performing S52 may be applied separately, or may be applied in combination. This is not specifically limited.

When the prerequisite for performing S52 is described, it is mentioned that the upper layer, such as the IP/TCP layer, of the PDCP layer usually determines the service continuity status based on the time interval at which data packets are received twice. If the upper layer of the PDCP layer determines that the time interval at which the data packets delivered by the PDCP layer are received twice is greater than or equal to the first time interval, the upper layer of the PDCP layer determines that service interruption occurs, and then the upper layer of the PDCP layer may re-initiate a service request. However, in the technical solutions provided in this embodiment of this application, running of the reordering timer is stopped, and when running of the reordering timer is stopped, the previous out-of-order data packet is not delivered to the upper layer. Therefore, the upper layer may not receive, within a relatively long time period, a data packet delivered by the PDCP layer. Therefore, to avoid as much as possible a case in which the upper layer determines that service interruption occurs, in this embodiment of this application, in addition to considering stopping running of the reordering timer when PDCP re-establishment or data recovery is performed, how to restart the reordering timer as soon as possible may be further considered, to recover as soon as possible a mechanism for delivering a data packet to the upper layer, so that the upper layer can receive the data packet from the PDCP layer as early as possible.

In view of this, in this embodiment of this application, after the PDCP layer stops running of the reordering timer, the PDCP layer may further restart the reordering timer when a first condition is satisfied. After the reordering timer is restarted, for a working process of the PDCP layer, refer to the description for FIG. 2.

The first condition may include one or any combination of a first sub-condition, a second sub-condition, a third sub-condition, or a fourth sub-condition. These sub-conditions are separately described below.

1. First sub-condition: The PDCP layer receives a first data packet, and the PDCP layer determines that a value obtained by adding 1 to a largest count value of a data packet received by the PDCP layer is greater than a count value of the 1st data packet that is not received by the PDCP layer before the reordering timer is last started.

In the first sub-condition, after stopping running of the reordering timer, the receiving device determines, when receiving a data packet, whether to restart the reordering timer. Determining, when a data packet is received, whether to start the reordering timer is similar to a current determining mechanism. This helps make the technical solutions provided in this embodiment of this application compatible with an existing protocol. The first data packet may be the 1st data packet received by the receiving device after the receiving device stops running of the reordering timer, or may be any other data packet that is other than the 1st data packet and that is received by the receiving device after the receiving device stops running of the reordering timer. For example, if the receiving device is a terminal device, the first data packet may be a data packet received by the terminal device from a new network device after cell handover or cell change is completed.

An example in which the receiving device is a terminal device is used. For example, before re-establishing a PDCP layer of the terminal device, the terminal device receives a data packet 0, a data packet 1, a data packet 2, a data packet 4, and a data packet 6, and a sequence of receiving these data packets is: data packet 0→data packet 4→data packet 1→data packet 2→data packet 6. In this case, when receiving the data packet 4, the PDCP layer starts the reordering timer, and sets a value of RX_DELIV to 1, a value of RX_NEXT to 5, and a value of RX_REORD to 5. Then, the PDCP layer receives the data packet 1, and the PDCP layer updates the value of RX_DELIV to 2. The value of RX_NEXT and the value of RX_REORD remain unchanged. In addition, the PDCP layer delivers the data packet 1 to the upper layer (the PDCP layer has delivered the data packet 0 to the upper layer after receiving the data packet 0). Then, the PDCP layer receives the data packet 2, and the PDCP layer updates the value of RX_DELIV to 3. The value of RX_NEXT and the value of RX_REORD remain unchanged. In addition, the PDCP layer delivers the data packet 2 to the upper layer. Then, the PDCP layer receives the data packet 6, and the PDCP layer updates RX_NEXT to 7. Subsequently, the terminal device performs cell handover, and starts to re-establish the PDCP layer. In addition, the terminal device stops running of the reordering timer. However, in this case, the PDCP layer does not deliver the data packet 4 to the upper layer, and does not update values of variables such as RX_DELIV, RX_REORD, and RX_NEXT.

After the terminal device completes cell handover, the new network device (or referred to as a target network device) sends a data packet to the terminal device. For example, the new network device sends a data packet 3. In this case, the PDCP layer delivers the data packet 3 and the data packet 4 to the upper layer, and a data packet 5 becomes the 1st unreceived data packet. In this case, the largest count value of the data packet received by the PDCP layer is 6, and a value obtained after adding 1 to 6 is 7. The 1st data packet that is not received by the PDCP layer before the reordering timer is last started is the data packet 1 (the count value of the 1st data packet that is not received by the PDCP layer before the reordering timer is last started should be a corresponding value of RX_DELIV existing when the reordering timer is last started). Because 7 is greater than 1, the terminal device determines that the first condition is satisfied.

2. Second sub-condition: The PDCP layer receives a first data packet, and the PDCP layer determines that a value obtained by adding 1 to a largest count value of a data packet received by the PDCP layer is greater than a count value of the 1st data packet that is not received by the PDCP layer.

Alternatively, the second sub-condition may be described as follows: The PDCP layer receives a first data packet, and the PDCP layer determines that a first variable is greater than a second variable, where the first variable is used to indicate a count value of a next data packet that the receiving device expects to receive, and the second variable indicates a count value of the 1st data packet that is not delivered to the upper layer and for which the PDCP layer still waits.

The count value of the next data packet that the receiving device expects to receive is the value obtained by adding 1 to the largest count value of the data packet received by the PDCP layer. The 1st data packet that is not received by the PDCP layer is the 1st data packet that is not delivered to the upper layer and for which the PDCP layer still waits.

Likewise, in the second sub-condition, after stopping running of the reordering timer, the receiving device determines, when receiving a data packet, whether to restart the reordering timer. Determining, when a data packet is received, whether to start the reordering timer is similar to a current determining mechanism. This helps make the technical solutions provided in this embodiment of this application compatible with an existing protocol. For a description of the first data packet, refer to the related description for the first sub-condition.

An example in which the receiving device is a terminal device is used. For example, before re-establishing a PDCP layer of the terminal device, the terminal device receives a data packet 0, a data packet 1, a data packet 2, a data packet 4, and a data packet 6, and a sequence of receiving these data packets is: data packet 0→data packet 4→data packet 1→data packet 2→data packet 6. In this case, when receiving the data packet 4, the PDCP layer starts the reordering timer, and sets a value of RX_DELIV to 1, a value of RX_NEXT to 5, and a value of RX_REORD to 5. Then, the PDCP layer receives the data packet 1, and the PDCP layer updates the value of RX_DELIV to 2. The value of RX_NEXT and the value of RX_REORD remain unchanged. In addition, the PDCP layer delivers the data packet 1 to the upper layer (the PDCP layer has delivered the data packet 0 to the upper layer after receiving the data packet 0). Then, the PDCP layer receives the data packet 2, and the PDCP layer updates the value of RX_DELIV to 3. The value of RX_NEXT and the value of RX_REORD remain unchanged. In addition, the PDCP layer delivers the data packet 2 to the upper layer. Then, the PDCP layer receives the data packet 6, and the PDCP layer updates RX_NEXT to 7. Subsequently, the terminal device performs cell handover, and starts to re-establish the PDCP layer. In addition, the terminal device stops running of the reordering timer. However, in this case, the PDCP layer does not deliver the data packet 4 to the upper layer, and does not update values of variables such as RX_DELIV, RX_REORD, and RX_NEXT.

After the terminal device completes cell handover, the new network device (or referred to as a target network device) sends a data packet to the terminal device. For example, the new network device sends a data packet 3. In this case, the PDCP layer delivers the data packet 3 and the data packet 4 to the upper layer, and a data packet 5 becomes the 1st unreceived data packet. In this case, the largest count value of the data packet received by the PDCP layer is 6, and a value obtained after adding 1 to 6 is 7. The 1st data packet that is not received by the PDCP layer is the data packet 5. Because 7 is greater than 5, the terminal device determines that the first condition is satisfied.

3. Third sub-condition: The receiving device completes sending an RRC connection establishment complete (RRC connection establishment complete) message to a network device, where the RRC connection establishment complete message is used to indicate that the receiving device completes cell handover.

An example in which the receiving device is a terminal device is mainly used for the third sub-condition.

In a cell handover process of the terminal device, a new network device sends a radio resource control (radio resource control, RRC) connection establishment request message to the terminal device, and the terminal device sends an RRC connection establishment complete message to the new network device after completing handover. The RRC connection establishment complete message may indicate that the terminal device completes the cell handover, but may not necessarily indicate that the terminal device completes re-establishment of a PDCP layer of the terminal device, and the re-establishment of the PDCP layer may be completed before the terminal device completes the cell handover.

When the terminal device completes sending the RRC connection establishment complete message to the new network device, the new network device may still not send a data packet to the terminal device because the new network device requires a specific time period for processing. In other words, when the terminal device completes sending the RRC connection establishment complete message to the network device, the terminal device may still not receive a data packet from the new network device. Therefore, when the third sub-condition is satisfied, the terminal device may directly start the reordering timer without determining a variable such as RX_DELIV 4. Fourth sub-condition: The receiving device completes sending a status report to a network device, where the status report is used to indicate information about a data packet received by the receiving device before the receiving device is handed over to the network device.

An example in which the receiving device is a terminal device is also mainly used for the fourth sub-condition.

For example, after completing cell handover, the terminal device may send a status report (status report) to a new network device, to indicate information about a data packet that has been received by the terminal device, so that the new network device may send, to the terminal device, only a data packet that has not been received by the terminal device before. In the fourth sub-condition, when completing sending the status report to the network device, the receiving device may directly start the reordering timer without determining a variable such as RX_DELIV.

When completing sending the status report to the network device, the terminal device may receive a data packet from the network device, or may not receive a data packet from the network device. This relates to a specific manner of applying the first sub-condition, the second sub-condition, and the fourth sub-condition.

In this embodiment of this application, it may be specified that the receiving device uses only one sub-condition. For example, it is specified that the receiving device uses only the fourth sub-condition. In this case, when the receiving device completes sending the status report to the network device, regardless of whether the receiving device receives a data packet from the network device, the receiving device may directly start the reordering timer without determining a variable such as RX_DELIV. In this case, even if the receiving device receives a data packet from the network device before the receiving device completes sending the status report to the network device, the receiving device may not need to start the reordering timer, but start the reordering timer after the receiving device completes sending the status report to the network device.

Alternatively, it is specified that the receiving device uses only the first sub-condition or the second sub-condition. In this case, when receiving the first data packet, the receiving device determines whether to start the reordering timer, and whether to start the reordering timer is not related to sending of the status report.

Alternatively, it may be specified that the receiving device may apply the first sub-condition (or the second sub-condition) and the fourth sub-condition in combination. In this case, if the receiving device receives the first data packet before the receiving device completes sending the status report to the network device, the receiving device may directly apply the first sub-condition (or the second sub-condition) to determine whether to start the reordering timer, without applying the fourth sub-condition. Alternatively, if the receiving device has not received the first data packet when the receiving device completes sending the status report to the network device, the receiving device may directly apply the fourth sub-condition, that is, directly start the reordering timer. Alternatively, if the receiving device just receives the first data packet when the receiving device completes sending the status report to the network device, the receiving device may apply the first sub-condition (or the second sub-condition) to determine whether to start the reordering timer, but not apply the fourth sub-condition. Alternatively, the receiving device may apply the fourth sub-condition, and directly start the reordering timer, but not apply the first sub-condition (or the second sub-condition).

The foregoing several sub-conditions that may be included in the first condition are merely some examples. Sub-conditions actually included in the first condition are not limited in this embodiment of this application.

Alternatively, to avoid as much as possible a case in which the upper layer determines that service interruption occurs, in this embodiment of this application, the PDCP layer may not need to consider restarting the reordering timer as soon as possible, but it is specified that in the re-establishment process of the PDCP layer, in a period from the beginning of the re-establishment of the PDCP layer to the end of the re-establishment, in a data recovery process of the PDCP layer, in a period from the beginning of the data recovery of the PDCP layer to the end of the data recovery, or in a process in which the receiving device performs cell handover or cell change, the upper layer of the PDCP layer does not determine whether service interruption occurs. In this case, the upper layer of the PDCP layer does not re-initiate a service request. This can also ensure service continuity.

In this embodiment of this application, running of the reordering timer can be stopped in a timely manner when PDCP re-establishment or data recovery is performed, to reduce a packet loss rate caused because the reordering timer expires during the PDCP re-establishment. In addition, the reordering timer can be restarted in a timely manner as much as possible after running of the reordering timer is stopped, so that the upper layer of the PDCP layer can receive a data packet from the PDCP layer as soon as possible. This reduces a probability that the upper layer considers that service interruption occurs, and improves service continuity.

Figure 6:
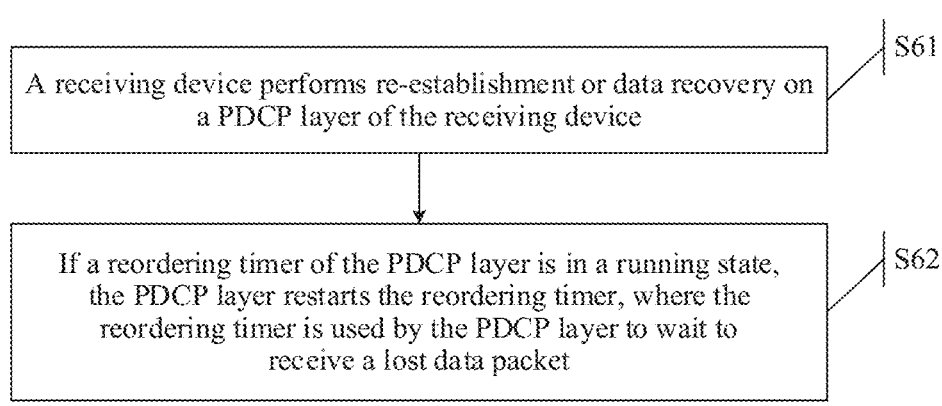
FIG. 6 is a flowchart of a second timer control method according to an embodiment of this application.

To resolve the same technical problem, an embodiment of tins application provides a second timer control method. FIG. 6 is a flowchart of the method. In the following description process, an example in which the method is applied to the network architecture shown in FIG. 4 is still used. In addition, the method may be performed by a communications apparatus. The communications apparatus is, for example, a first communications apparatus, and the first communications apparatus can implement a function of a receiving device. The first communications apparatus may be a network device or a communications apparatus that can support a function required by a network device to implement the method. Alternatively, the first communications apparatus may be a terminal device or a communications apparatus that can support a function required by a terminal device to implement the method. Certainly, the first communications apparatus may alternatively be another communications apparatus, for example, a chip system.

For ease of description, an example m which the first communications apparatus is a receiving device is used below. If this embodiment is applied to the network architecture shown in FIG. 4, the following receiving device used to perform the embodiment shown in FIG. 6 may be the network device or the terminal device in the network architecture shown m FIG. 4. In addition, the following process may be further related to a transmitting device corresponding to the receiving device. Similarly, the transmitting device may be a network device or a communications apparatus that can support a function required by a network device to implement the method. Alternatively, the transmitting device may be a terminal device or a communications apparatus that can support a function required by a terminal device to implement the method. Certainly, a function of the transmitting device may be alternatively implemented by using another communications apparatus, for example, a chip system. If the network architecture shown in FIG. 4 is used as an example, for example, the network device in the network architecture shown in FIG. 4 is the receiving device described in this specification, and the terminal device in the network architecture shown in FIG. 4 is the transmitting device described in this specification, or the network device in the network architecture shown in FIG. 4 is the transmitting device described in this specification, and the terminal device in the network architecture shown in FIG. 4 is the receiving device described in this specification. In a process of describing the embodiment shown in FIG. 6, an example in which the receiving device is the terminal device and the transmitting device is the network device is used in most cases.

S61: The receiving device performs re-establishment or data recovery on a PDCP layer of the receiving device.

For S61, refer to S51 in the embodiment shown in FIG. 5.

In addition, for an AM, a MAC layer supports a HARQ mechanism. Data packets received by the receiving device may be out of order due to parallel running of a plurality of HARQ processes. An RLC layer supports an ARQ mechanism. This may also cause a result that received data packets are out of order. Therefore, in this embodiment of this application, the re-establishment of the PDCP layer may be PDCP layer re-establishment for an AM DRB, or the data recovery of the PDCP layer may be PDCP layer data recovery for an AM DRB.

S62: If a reordering timer of the PDCP layer is in a running state, the PDCP layer restarts the reordering timer, where the reordering timer is used by the PDCP layer to wait to receive a lost data packet.

Restarting the reordering timer may be understood as stopping and resetting the reordering timer, and restarting the reordering timer. For a feature of resetting the reordering timer, refer to the related description in the embodiment shown in FIG. 5.

An implementation of this embodiment of this application is relatively simple. When the receiving device performs re-establishment or data recovery on the PDCP layer of the receiving device, if the reordering timer is in a running state, the PDCP layer restarts the reordering timer. In addition, because the reordering timer is restarted rather than expires, the PDCP layer does not deliver a previous out-of-order data packet to an upper layer of the PDCP layer, that is, does not deliver, to the upper layer of the PDCP layer, a data packet whose count value is greater than a count value of the 1st data packet that is not received by the PDCP layer, and does not update a value of RX_DELIV. As the value of RX_DELIV is not updated, a valid time window does not change. Therefore, after the PDCP layer re-establishment is completed, if the receiving device receives a data packet, the receiving device may further perform determining based on the original valid time window. If the newly received data packet is a data packet that is not received by the receiving device before handover or reselection, the receiving device may also identify the data packet and may order the received data packet and the data packet that is not delivered to the upper layer previously. In this way, a packet loss rate is reduced, and a probability that the PDCP layer delivers the out-of-order data packet to the upper layer is also reduced as much as possible. This ensures as much as possible that all data packets received by the upper layer are in order.

As described in the embodiment shown in FIG. 5, there may be a corresponding prerequisite for performing S52. In this embodiment of this application, in an optional manner, there may also be a corresponding prerequisite for performing S62. For a specific description of the prerequisite, refer to the description of the prerequisite for performing S52 in the embodiment shown in FIG. 5.

In addition, although the reordering timer is restarted when the PDCP layer is re-established, in a process of re-establishing the PDCP layer, the reordering timer may still expire. For example, if the re-establishment process of the PDCP layer is relatively long, or the total duration of the reordering timer is relatively short, the reordering timer may expire in the re-establishment process of the PDCP layer. In this embodiment of this application, in the re-establishment process of the PDCP layer, when the reordering timer expires, the PDCP layer may restart the reordering timer. In addition, because the reordering timer is restarted rather than expires, the PDCP layer does not deliver a previous out-of-order data packet to an upper layer of the PDCP layer, that is, does not deliver, to the upper layer of the PDCP layer, a data packet whose count value is greater than a count value of the 1st data packet that is not received by the PDCP layer, and does not update a value of RX_DELIV. In this manner, it can be avoided as much as possible that the reordering timer expires in the re-establishment process of the PDCP layer, and a packet loss rate can be reduced.

In this embodiment of this application, the reordering timer can be restarted in a timely manner when PDCP re-establishment or data recovery is performed. In addition, the reordering timer can be restarted in a timely manner even in the re-establishment process of the PDCP layer. This reduces a packet loss rate caused because the reordering timer expires during the PDCP re-establishment.

Figure 7:
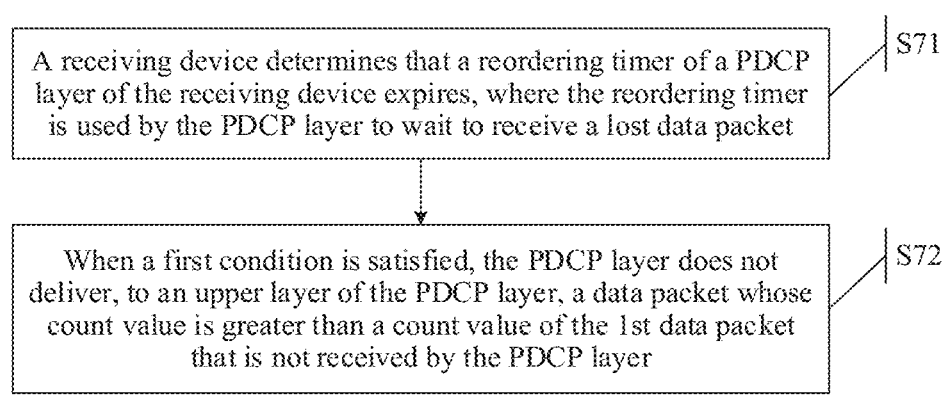
FIG. 7 is a flowchart of a data packet processing method according to an embodiment of this application.

To resolve the same technical problem, an embodiment of this application provides a data packet processing method. FIG. 7 is a flowchart of the method. In the following description process, an example in which the method is applied to the network architecture shown in FIG. 4 is still used. In addition, the method may be performed by a communications apparatus. The communications apparatus is, for example, a first communications apparatus, and the first communications apparatus can implement a function of a receiving device. The first communications apparatus may be a network device or a communications apparatus that can support a function required by a network device to implement the method. Alternatively, the first communications apparatus may be a terminal device or a communications apparatus that can support a function required by a terminal device to implement the method. Certainly, the first communications apparatus may alternatively be another communications apparatus, for example, a chip system.

For ease of description, an example in which the first communications apparatus is a receiving device is used below. If this embodiment is applied to the network architecture shown in FIG. 4, the following receiving device used to perform the embodiment shown in FIG. 7 may be the network device or the terminal device in the network architecture shown in FIG. 4. In addition, the following process may be further related to a transmitting device corresponding to the receiving device. Similarly, the transmitting device may be a network device or a communications apparatus that can support a function required by a network device to implement the method. Alternatively, the transmitting device may be a terminal device or a communications apparatus that can support a function required by a terminal device to implement the method. Certainly, a function of the transmitting device may be alternatively implemented by using another communications apparatus, for example, a chip system. If the network architecture shown in FIG. 4 is used as an example, for example, the network device in the network architecture shown in FIG. 4 is the receiving device described in this specification, and the terminal device in the network architecture shown in FIG. 4 is the transmitting device described in this specification, or the network device in the network architecture shown in FIG. 4 is the transmitting device described in this specification, and the terminal device in the network architecture shown in FIG. 4 is the receiving device described in this specification. In a process of describing the embodiment shown in FIG. 7, an example in which the receiving device is the terminal device and the transmitting device is the network device is used in most cases.

S71: The receiving device determines that a reordering timer of a PDCP layer of the receiving device expires, where the reordering timer is used by the PDCP layer to wait to receive a lost data packet.

S72: When a first condition is satisfied, the PDCP layer does not deliver, to an upper layer of the PDCP layer, a data packet whose count value is greater than a count value of the 1st data packet that is not received by the PDCP layer.

As described in the embodiment shown in FIG. 5, there may be a corresponding prerequisite for performing S52. In this embodiment of this application, in an optional manner, there may also be a corresponding prerequisite for performing S72. For a specific description of the prerequisite, refer to the description of the prerequisite for performing S52 in the embodiment shown in FIG. 5.

The first condition described in this embodiment of this application is different from the first condition described in the embodiment shown in FIG. 5 or FIG. 6. In this embodiment of this application, the first condition includes one or any combination of a first sub-condition, a second sub-condition, a third sub-condition, a fourth sub-condition, a fifth sub-condition, or a sixth sub-condition. These sub-conditions are separately described below.

1. First sub-condition: before the receiving device re-establishes the PDCP layer of the receiving device.

Alternatively, the first sub-condition may be: when the receiving device re-establishes the PDCP layer of the receiving device.

An example in which the receiving device is a terminal device is used. For example, when the terminal device performs cell handover or cell reselection between different network devices, a PDCP layer of the terminal device may need to be re-established. In a re-establishment process of the PDCP layer, the terminal device does not receive a data packet, and neither an old network device nor a new network device sends a data packet to the terminal device. Only after the handover or reselection of the terminal device is completed, the new network device continues to send a data packet to the terminal device. During re-establishment of the PDCP layer, the reordering timer may expire. In a current processing manner, the terminal device delivers, to the upper layer, all out-of-order data packets received before the reordering timer expires, and updates a value of RX_DELIV. After the handover or reselection of the terminal device is completed, the new network device continues to send a data packet to the terminal device. After receiving the data packet, the PDCP layer of the terminal device determines whether a count value of the data packet is within a valid receive window. Because the value of RX_DELIV has been updated, the count value of the newly received data packet may not be within the valid receive window. In this case, the terminal device discards the newly received data packet. However, because the value of RX_DELIV is abnormally updated, the newly received data packet is probably a data packet that is not received by the terminal device before the handover or reselection.

In view of this, in this embodiment of this application, before the receiving device re-establishes the PDCP layer of the receiving device or when the receiving device re-establishes the PDCP layer of the receiving device, if the reordering timer expires, the PDCP layer may not deliver, to the upper layer of the PDCP layer, the data packet whose count value is greater than the count value of the 1st data packet that is not received by the PDCP layer. Because the PDCP layer may not deliver, to the upper layer of the PDCP layer, the data packet whose count value is greater than the count value of the 1st data packet that is not received by the PDCP layer, the PDCP layer does not update a value of a variable such as RX_DELIV. In other words, if the reordering timer expires, the PDCP layer may not deliver an out-of-order data packet whose count value is less than RX_REORD to the upper layer of the PDCP layer. When the PDCP layer subsequently receives a data packet, the PDCP layer updates a variable value based on a normal receiving status.

An example in which the receiving device is a terminal device is used. For example, the terminal device sequentially receives a data packet 0, a data packet 4, and a data packet 1. In this case, when receiving the data packet 4, the PDCP layer starts the reordering timer, and sets a value of RX_DELIV to 1, a value of RX_NEXT to 5, and a value of RX_REORD to 5. Then, the PDCP layer receives the data packet 1, and the PDCP layer updates the value of RX_DELIV to 2. The value of RX_NEXT and the value of RX_REORD remain unchanged. In addition, the PDCP layer delivers the data packet 1 to the upper layer (the PDCP layer has delivered the data packet 0 to the upper layer after receiving the data packet 0). Subsequently, before the terminal device re-establishes the PDCP layer of the terminal device or when the terminal device re-establishes the PDCP layer of the terminal device, the reordering timer expires. In this case, the PDCP layer may not deliver the data packet 4 to the upper layer, and not update a value of a variable such as RX_DELIV. Thus, the value of RX_DELIV is still 2, and the value of RX_NEXT and the value of RX_REORD are still 5.

As the value of RX_DELIV is not updated, a valid time window does not change. Therefore, after the PDCP layer re-establishment is completed, if the receiving device receives a data packet, the receiving device may further perform determining based on the original valid time window. If the newly received data packet is a data packet that is not received by the receiving device before handover or reselection, the receiving device may also identify the data packet and may order the received data packet and the data packet that is not delivered to the upper layer previously. In tis way, a packet loss rate is reduced, and a probability that the PDCP layer delivers the out-of-order data packet to the upper layer is also reduced as much as possible. This ensures as much as possible that all data packets received by the upper layer are in order.

In addition, for an AM, a MAC layer supports a HARQ mechanism. Data packets received by the receiving device may be out of order due to parallel running of a plurality of HARQ processes. An RLC layer supports an ARQ mechanism. This may also cause a result that received data packets are out of order. Therefore, in this embodiment of this application, the re-establishment of the PDCP layer may be PDCP layer re-establishment for an AM DRB, or data recovery of the PDCP layer may be PDCP layer data recovery for an AM DRB.

2. Second sub-condition: in a process in which the receiving device re-establishes the PDCP layer of the receiving device.

For the first sub-condition, before the receiving device re-establishes the PDCP layer or when the receiving device re-establishes the PDCP layer, if the reordering timer expires, the PDCP layer may not deliver, to the upper layer of the PDCP layer, the data packet whose count value is greater than the count value of the 1st data packet that is not received by the PDCP layer. For the second sub-condition, in a process in which the receiving device re-establishes the PDCP layer, if the reordering timer expires, the PDCP layer may not deliver, to the upper layer of the PDCP layer, the data packet whose count value is greater than the count value of the 1st data packet that is not received by the PDCP layer. Because the PDCP layer does not deliver a previous out-of-order data packet to the upper layer, a value of RX_DELIV is not updated. As the value of RX_DELIV is not updated, a valid time window does not change. Therefore, after the PDCP layer re-establishment is completed, if the receiving device receives a data packet, the receiving device may further perform determining based on the original valid time window. If the newly received data packet is a data packet that is not received by the receiving device before handover or reselection, the receiving device may also identify the data packet and may order the received data packet and the data packet that is not delivered to the upper layer previously. In this way, a packet loss rate is reduced, and a probability that the PDCP layer delivers the out-of-order data packet to the upper layer is also reduced as much as possible. This ensures as much as possible that all data packets received by the upper layer are in order.

3. Third sub-condition: after the receiving device completes cell handover and before the PDCP layer of the receiving device receives the 1st data packet.

An example in which the receiving device is a terminal device is mainly used for the third sub-condition.

After the terminal device completes cell handover and before the PDCP layer receives the 1st data packet from a new network device, if the reordering timer expires, in a processing manner in the conventional technology, the PDCP layer delivers a previously received out-of-order data packet to the upper layer, and updates a value of a variable such as RX_DELIV. In tis case, if the PDCP layer receives a data packet from the new network device, it is likely that a count value of the data packet is not within a valid time window because the value of RX_DELIV is updated, and consequently, the PDCP layer discards the data packet.

Therefore, in this embodiment of this application, after the terminal device completes cell handover and before the PDCP layer receives the 1st data packet from the new network device, if the reordering timer expires, the PDCP layer does not deliver the previously received out-of-order data packet to the upper layer, that is, does not deliver, to the upper layer of the PDCP layer, the data packet whose count value is greater than the count value of the 1st data packet that is not received by the PDCP layer. Because the data packet whose count value is greater than the count value of the 1st data packet that is not received by the PDCP layer is not delivered to the upper layer of the PDCP layer, the PDCP layer does not update a value of a variable such as RX_DELIV. In this case, a probability that a count value of a data packet subsequently received by the PDCP layer from the new network device is still within the valid time window is relatively high, so that a packet loss rate is reduced.

4. Fourth sub-condition: the receiving device completes sending an RRC connection establishment complete message to a network device, where the RRC connection establishment complete message is used to indicate that the receiving device completes cell handover.

An example in which the receiving device is a terminal device is mainly used for the fourth sub-condition.

In a cell handover process of the terminal device, a new network device sends an RRC connection establishment request message to the terminal device, and the terminal device sends an RRC connection establishment complete message to the new network device after completing handover. The RRC connection establishment complete message may indicate that the terminal device completes the cell handover, but may not necessarily indicate that the terminal device completes re-establishment of a PDCP layer of the terminal device, and the re-establishment of the PDCP layer may be completed before the terminal device completes the cell handover.

When the terminal device completes sending the RRC connection establishment complete message to the network device, the terminal device may still not receive a data packet from the network device. In other words, the terminal device still does not receive a data packet from the new network device after the terminal device completes handover. In this case, when the new network device subsequently sends a data packet, it is likely that the new network device sends a data packet that is not received by the terminal device previously. According to the conventional technology, when the reordering timer expires, the PDCP layer delivers a previously received out-of-order data packet to the upper layer, and updates a value of a variable such as RX_DELIV. In this case, if the PDCP layer subsequently receives a data packet from the new network device, it is likely that a count value of the data packet is not within a valid time window because the value of RX_DELIV is updated, and consequently, the PDCP layer discards the data packet.

Therefore, in this embodiment of this application, when the terminal device completes sending the RRC connection establishment complete message to the network device, if the reordering timer expires, the PDCP layer does not deliver the previously received out-of-order data packet to the upper layer, that is, does not deliver, to the upper layer of the PDCP layer, the data packet whose count value is greater than the count value of the 1st data packet that is not received by the PDCP layer. Because the data packet whose count value is greater than the count value of the 1st data packet that is not received by the PDCP layer is not delivered to the upper layer of the PDCP layer, the PDCP layer does not update a value of a variable such as RX_DELIV. In this case, a probability that a count value of a data packet subsequently received by the PDCP layer from the new network device is still within the valid time window is relatively high, so that a packet loss rate is reduced.

5. Fifth sub-condition: the receiving device completes sending a status report to a network device, where the status report is used to indicate information about a data packet received by the receiving device before the receiving device is handed over to the network device.

An example in which the receiving device is a terminal device is mainly used for the fifth sub-condition.

For example, after completing cell handover, the terminal device may send a status report to a new network device, to indicate information about a data packet that has been received by the terminal device, so that the new network device may send, to the terminal device, only a data packet that has not been received by the terminal device before.

When the terminal device completes sending the status report to the network device, the terminal device may still not receive a data packet from the network device. In other words, the terminal device still does not receive a data packet from the new network device after the terminal device completes handover. In this case, when the new network device subsequently sends a data packet, it is likely that the new network device sends a data packet that is not received by the terminal device previously. According to the conventional technology, when the reordering timer expires, the PDCP layer delivers a previously received out-of-order data packet to the upper layer, and updates a value of a variable such as RX_DELIV. In this case, if the PDCP layer subsequently receives a data packet from the new network device, it is likely that a count value of the data packet is not within a valid time window because the value of RX_DELIV is updated, and consequently, the PDCP layer discards the data packet.

Therefore, in this embodiment of this application, when the terminal device completes sending the status report to the network device, if the reordering timer expires, the PDCP layer does not deliver the previously received out-of-order data packet to the upper layer, that is, does not deliver, to the upper layer of the PDCP layer, the data packet whose count value is greater than the count value of the 1st data packet that is not received by the PDCP layer. Because the data packet whose count value is greater than the count value of the 1st data packet that is not received by the PDCP layer is not delivered to the upper layer of the PDCP layer, the PDCP layer does not update a value of a variable such as RX_DELIV. In this case, a probability that a count value of a data packet subsequently received by the PDCP layer from the new network device is still within the valid time window is relatively high, so that a packet loss rate is reduced.

6. Sixth sub-condition: before the receiving device completes a random access process.

An example in which the receiving device is a terminal device is also mainly used for the sixth sub-condition.

Before the terminal device completes a random access process, the terminal device may still not receive a data packet from a network device. In other words, the terminal device still does not receive a data packet from the new network device after the terminal device completes handover. In this case, when the new network device subsequently sends a data packet, it is likely that the new network device sends a data packet that is not received by the terminal device previously. According to the conventional technology, when the reordering timer expires, the PDCP layer delivers a previously received out-of-order data packet to the upper layer, and updates a value of a variable such as RX_DELIV. In this case, if the PDCP layer receives a data packet from the new network device, it is likely that a count value of the data packet is not within a valid time window because the value of RX_DELIV is updated, and consequently, the PDCP layer discards the data packet.

Therefore, in this embodiment of this application, before the terminal device completes the random access process, if the reordering timer expires, the PDCP layer does not deliver the previously received out-of-order data packet to the upper layer, that is, does not deliver, to the upper layer of the PDCP layer, the data packet whose count value is greater than the count value of the 1st data packet that is not received by the PDCP layer. Because the data packet whose count value is greater than the count value of the 1st data packet that is not received by the PDCP layer is not delivered to the upper layer of the PDCP layer, the PDCP layer does not update a value of a variable such as RX_DELIV. In this case, a probability that a count value of a data packet subsequently received by the PDCP layer from the new network device is still within the valid time window is relatively high, so that a packet loss rate is reduced.

The foregoing several sub-conditions that may be included in the first condition are merely some examples. Sub-conditions actually included in the first condition are not limited in this embodiment of this application.

In addition, in an optional manner, in this embodiment of this application, when the first condition is satisfied, in addition to not delivering, to the upper layer of the PDCP layer, the data packet whose count value is greater than the count value of the 1st data packet that is not received by the PDCP layer, the PDCP layer of the receiving device may further restart the reordering timer, so that the reordering timer continuously runs. Restarting the reordering timer may mean stopping and resetting the reordering timer, and restarting the reordering timer. For a description of a technical feature of resetting the reordering timer, refer to the embodiment shown in FIG. 5.

In this embodiment of this application, when the first condition is satisfied, if the reordering timer is in a running state, the PDCP layer may not deliver a previously received out-of-order data packet to the upper layer, that is, not deliver, to the upper layer of the PDCP layer, the data packet whose count value is greater than the count value of the 1st data packet that is not received by the PDCP layer. In addition, because the PDCP layer does not deliver the previously received out-of-order data packet to the upper layer, a value of RX_DELIV is not updated. As the value of RX_DELIV is not updated, a valid time window does not change. Therefore, after PDCP layer re-establishment is completed, if the PDCP layer receives a data packet, the PDCP layer may further perform determining based on the original valid time window. If the newly received data packet is a data packet that is not received by the receiving device before handover or reselection, the PDCP layer may also identify the data packet and may order the received data packet and the data packet that is not delivered to the upper layer previously. In this way, a packet loss rate is reduced, and a probability that the PDCP layer delivers the out-of-order data packet to the upper layer is also reduced as much as possible.

The following describes, with reference to the accompanying drawings, apparatuses configured to implement the foregoing methods in the embodiments of this application. Therefore, all the foregoing content may be used in the following embodiments, and repeated content is not described again.

Figure 8:
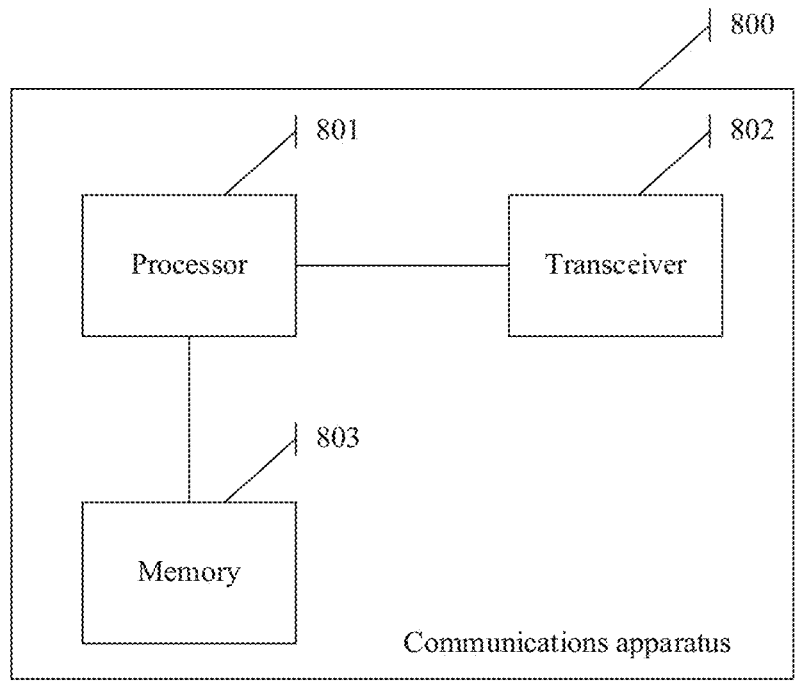
FIG. 8 is a schematic structural diagram of a communications apparatus that can implement a function of a receiving device according to an embodiment of this application.

An embodiment of this application provides a first type of communications apparatus. The communications apparatus is, for example, a first communications apparatus. Referring to FIG. 8, for example, the communications apparatus is a communications apparatus 800. The communications apparatus 800 may implement a function of the foregoing receiving device. The communications apparatus 800 may be the foregoing receiving device, or may be a chip disposed in the foregoing receiving device. The communications apparatus 800 may include a processor 801. The processor 801 may be configured to perform S51 and S52 in the embodiment shown in FIG. 5, and/or another process used to support the technology described in this specification. Specifically, the processor 801 may be configured to: perform S51 and S52 in the embodiment shown in FIG. 5 or perform another process used to support the technology described in this specification; or perform S51 and S52 in the embodiment shown in FIG. 5 and perform another process used to support the technology described in this specification. Optionally, the communications apparatus may further include a transceiver 802. The transceiver 802 may be configured to perform all receiving and sending operations performed by the receiving device in the embodiment shown m FIG. 5, for example, may be configured to perform a step such as receiving a data packet from a transmitting device, sending an RRC connection establishment complete message to a network device, or sending a status report to a network device in the embodiment shown in FIG. 5, and/or another process used to support the technology described in this specification. Specifically, the transceiver 802 is configured to: perform all the receiving and sending operations performed by the receiving device in the embodiment shown in FIG. 5 or perform another process used to support the technology described m this specification; or perform all the receiving and sending operations performed by the receiving device in the embodiment shown in FIG. 5 and perform another process used to support the technology described in this specification. Optionally, the communications apparatus may further include a memory 803, and the memory 803 may be configured to store instructions required by the processor 801 to perform a task.

For example, the processor 801 is configured to instruct the instructions stored in the memory 803, to perform re-establishment or data recovery on a PDCP layer of the communications apparatus 800; and if a reordering timer of the PDCP layer is in a running state, stop running of the reordering timer by using the PDCP layer, where the reordering timer is used by the PDCP layer to wait to receive a lost data packet.

In a possible implementation,
total duration of the reordering timer is less than a first threshold, and/or remaining running duration of the reordering timer is less than a second threshold; or
a time interval used to determine service interruption is greater than or equal to a third threshold, where when a time interval at which the PDCP layer delivers data packets to an upper layer of the PDCP layer twice is greater than or equal to the time interval used to determine service interruption, the processor 801 determines, by using the upper layer of the PDCP layer, that service interruption occurs.

In a possible implementation, the processor 801 is further configured to reset the reordering timer by using the PDCP layer.

In a possible implementation, the processor 801 is further configured to: after stopping running of the reordering timer by using the PDCP layer, start the reordering timer by using the PDCP layer when a first condition is satisfied.

In a possible implementation, the first condition includes one or any combination of the following:
the processor 801 receives a first data packet by using the PDCP layer, and the processor 801 determines, by using the PDCP layer, that a value obtained by adding 1 to a largest count value of a data packet received by the PDCP layer is greater than a count value of the 1st data packet that is not received by the PDCP layer before the reordering timer is last started;
the processor 801 receives a first data packet by using the PDCP layer, and the processor 801 determines, by using the PDCP layer, that a value obtained by adding 1 to a largest count value of a data packet received by the PDCP layer is greater than a count value of the 1st data packet that is not received by the PDCP layer;
the processor 801 receives a first data packet by using the PDCP layer, and the processor 801 determines, by using the PDCP layer, that a first variable is greater than a second variable, where the first variable is used to indicate a count value of a next data packet that the communications apparatus 800 expects to receive, and the second variable indicates a count value of the 1st data packet that is not delivered to the upper layer and for which the PDCP layer still waits;
the transceiver 802 completes sending an RRC connection establishment complete message to a network device, where the RRC connection complete message is used to indicate that the communications apparatus 800 completes cell handover or change; or
the transceiver 802 completes sending a status report to a network device, where the status report is used to indicate information about a data packet received by the communications apparatus 800 before the communications apparatus 800 is handed over to the network device.

In a possible implementation,
the re-establishment of the PDCP layer is re-establishment of a PDCP layer for an AM DRB; or
the data recovery of the PDCP layer is data recovery of a PDCP layer for an AM DRB.

All related content of the steps in the foregoing method embodiment may be cited in function descriptions of the corresponding functional modules. Details are not described herein again.

Figure 9:
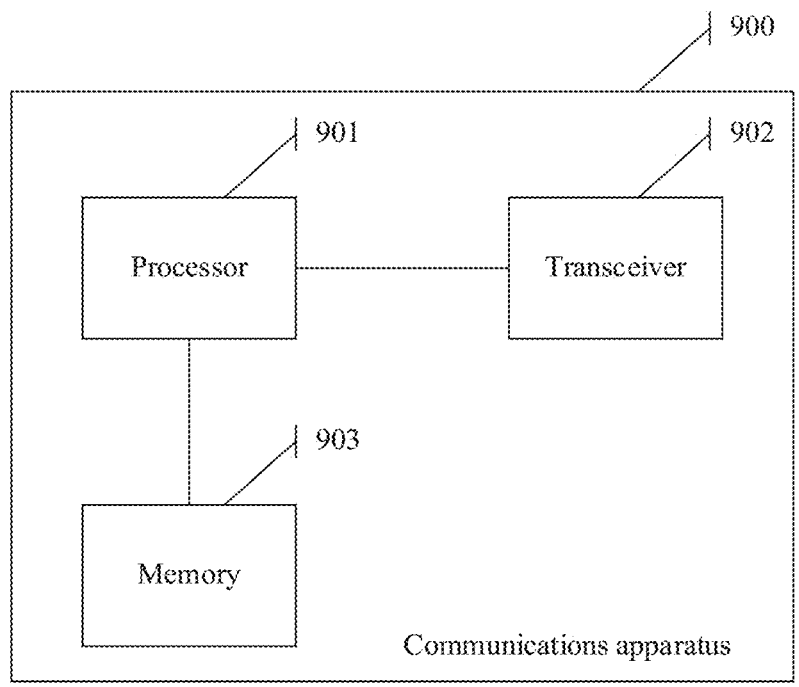
FIG. 9 is a schematic structural diagram of a communications apparatus that can implement a function of a receiving device according to an embodiment of this application.

An embodiment of this application provides a second type of communications apparatus. The communications apparatus is, for example, a second communications apparatus. Referring to FIG. 9, for example, the communications apparatus is a communications apparatus 900. The communications apparatus 900 may implement a function of the foregoing receiving device. The communications apparatus 900 may be the foregoing receiving device, or may be a chip disposed in the foregoing receiving device. The communications apparatus 900 may include a processor 901. The processor 901 may be configured to perform S61 and S62 in the embodiment shown in FIG. 6, and/or another process used to support the technology described in this specification. Specifically, the processor 901 may be configured to: perform S61 and S62 in the embodiment shown in FIG. 6 or perform another process used to support the technology described in this specification; or perform S61 and S62 in the embodiment shown in FIG. 6 and perform another process used to support the technology described in this specification. Optionally, the communications apparatus may further include a transceiver 902. The transceiver 902 may be configured to perform all receiving and sending operations performed by the receiving device in the embodiment shown in FIG. 6, for example, may perform a step such as receiving a data packet from a transmitting device, and/or another process used to support the technology described in this specification. Specifically, the transceiver 902 may be configured to: perform all the receiving and sending operations performed by the receiving device in the embodiment shown in FIG. 6 or perform another process used to support the technology described in this specification; or perform all the receiving and sending operations performed by the receiving device in the embodiment shown in FIG. 6 and perform another process used to support the technology described in this specification. Optionally, the communications apparatus may further include a memory 903, and the memory 903 may be configured to store instructions required by the processor 901 to perform a task.

For example, the processor 901 is configured to execute the instructions stored in the memory 903, to perform re-establishment or data recovery on a PDCP layer of the communications apparatus 900; and if a reordering timer of the PDCP layer is in a running state, restart the reordering timer by using the PDCP layer, where the reordering timer is used by the PDCP layer to wait to receive a lost data packet.

In a possible implementation, total duration of the reordering timer is less than a first threshold, and/or remaining running duration of the reordering timer is less than a second threshold; or a time interval used to determine service interruption is greater than or equal to a third threshold, where when a time interval at which the PDCP layer delivers data packets to an upper layer of the PDCP layer twice is greater than or equal to the time interval used to determine service interruption, the processor 901 determines, by using the upper layer of the PDCP layer, that service interruption occurs.

In a possible implementation, the processor 901 is configured to restart the reordering timer by using the PDCP layer in the following manner:

stopping and resetting the reordering timer by using the PDCP layer, and restarting the reordering timer.

In a possible implementation, in a process in which the processor 901 re-establishes the PDCP layer, the processor 901 is further configured to: when the reordering timer expires, restart the reordering timer by using the PDCP layer; and not deliver, to the upper layer of the PDCP layer, a data packet whose count value is greater than a count value of the 1st data packet that is not received by the PDCP layer.

In a possible implementation.

the re-establishment of the PDCP layer is re-establishment of a PDCP layer for an AM DRB; or the data recovery of the PDCP layer is data recovery of a PDCP layer for an AM DRB.

All related content of the steps in the foregoing method embodiment may be cited in function descriptions of the corresponding functional modules. Details are not described herein again.

Figure 10:
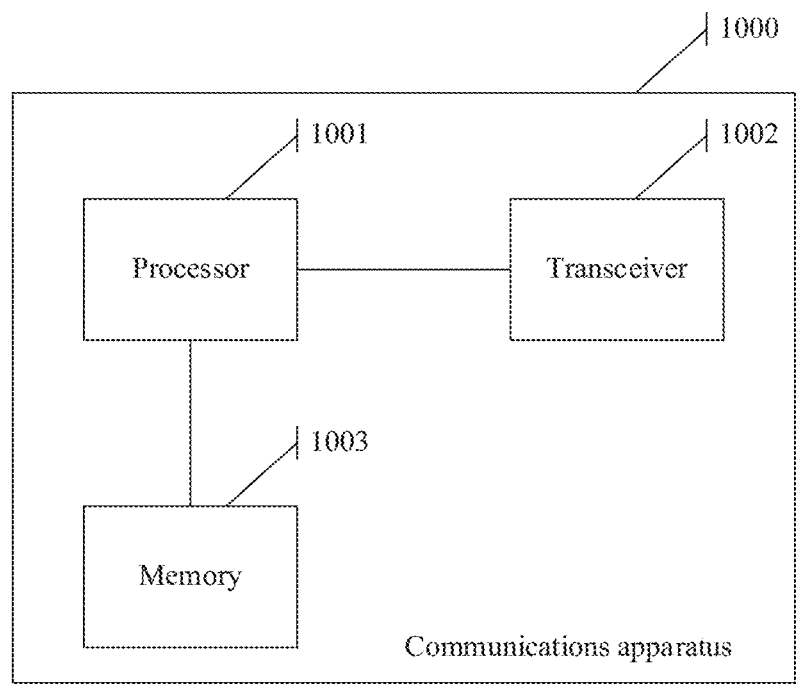
FIG. 10 is a schematic structural diagram of a communications apparatus that can implement a function of a receiving device according to an embodiment of this application.

An embodiment of this application provides a third type of communications apparatus. The communications apparatus is, for example, a third communications apparatus. Referring to FIG. 10, for example, the communications apparatus is a communications apparatus 1000. The communications apparatus 1000 may implement a function of the foregoing receiving device. The communications apparatus 1000 may be the foregoing receiving device, or may be a chip disposed in the foregoing receiving device. The communications apparatus 1000 may include a processor 1001. The processor 1001 may be configured to perform S71 and S72 in the embodiment shown in FIG. 7, and/or another process used to support the technology described in this specification. Specifically, the processor 1001 may be configured to: perform S71 and S72 in the embodiment shown in FIG. 7 or perform another process used to support the technology described in this specification; or perform S71 and S72 in the embodiment shown in FIG. 7 and perform another process used to support the technology described in this specification. Optionally, the communications apparatus may further include a transceiver 1002. The transceiver 1002 may be configured to perform all receiving and sending operations performed by the receiving device in the embodiment shown in FIG. 7, for example, may perform a step such as receiving a data packet from a transmitting device, and/or another process used to support the technology described in this specification. Specifically, the transceiver 1002 may be configured to: perform all the receiving and sending operations performed by the receiving device in the embodiment shown in FIG. 7 or perform another process used to support the technology described in this specification; or perform all the receiving and sending operations performed by the receiving device in the embodiment shown in FIG. 7 and perform another process used to support the technology described in this specification. Optionally, the communications apparatus may further include a memory 1003, and the memory 1003 may be configured to store instructions required by the processor 1001 to perform a task.

For example, the processor 1001 is configured to execute the instructions stored in the memory 1003, to determine that a reordering timer of a PDCP layer of the communications apparatus 1000 expires; and when a first condition is satisfied, not deliver, to an upper layer of the PDCP layer by using the PDCP layer, a data packet whose count value is greater than a count value of the 1st data packet that is not received by the PDCP layer, where the reordering timer is used by the PDCP layer to wait to receive a lost data packet.

In a possible implementation, the processor 1001 is further configured to: when the first condition is satisfied, stop and reset the reordering timer by using the PDCP layer, and restart the reordering timer.

In a possible implementation, the first condition includes one or any combination of the following:

before the communications apparatus 1000 re-establishes the PDCP layer;

in a process in which the communications apparatus 1000 re-establishes the PDCP layer;

after the communications apparatus 1000 completes cell handover and before the PDCP layer receives the 1st data packet;

the transceiver 1002 completes sending an RRC connection establishment complete message to a network device, where the RRC connection establishment complete message is used to indicate that the communications apparatus 1000 completes cell handover;

the transceiver 1002 completes sending a status report to a network device, where the status report is used to indicate information about a data packet received by the communications apparatus 1000 before the receiving device is handed over to the network device; or before the communications apparatus 1000 completes a random access process.

In a possible implementation, total duration of the reordering timer is less than a first threshold, and/or remaining running duration of the reordering timer is less than a second threshold; or a time interval used to determine service interruption is greater than or equal to a third threshold, where when a time interval at which the PDCP layer delivers data packets to the upper layer of the PDCP layer twice is greater than or equal to the time interval used to determine service interruption, the processor 1001 determines, by using the upper layer of the PDCP layer, that service interruption occurs.

In a possible implementation, the re-establishment of the PDCP layer is re-establishment of a PDCP layer for an AM DRB; or data recovery of the PDCP layer is data recovery of a PDCP layer for an AM DRB.

All related content of the steps in the foregoing method embodiment may be cited in function descriptions of the corresponding functional modules. Details are not described herein again.

Figure 11A:
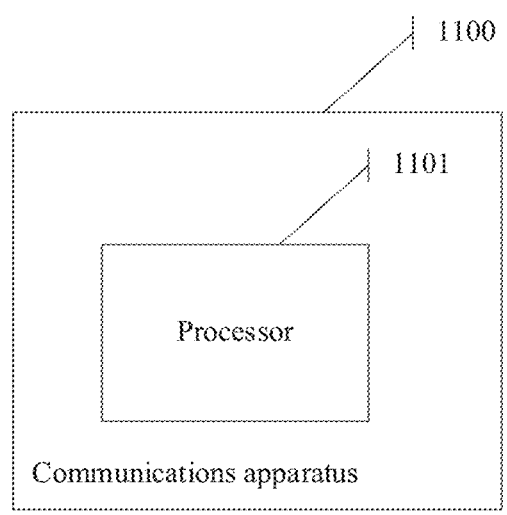
FIG. 11A and FIG. 11 are two schematic structural diagrams of a communications apparatus according to an embodiment of this application.

In a simple embodiment, a person skilled in the art can figure out that the communications apparatuses described above may alternatively be implemented by using a structure of a communications apparatus 1100 shown in FIG. 11A. The communications apparatus 1100 may implement a function of the terminal device or the network device described above. The communications apparatus 1100 may include a processor 1101.

When the communications apparatus 1100 is configured to implement a function of the receiving device described above, the processor 1101 may be configured to perform S51 and S52 in the embodiment shown in FIG. 5, and/or another process used to support the technology described in this specification. Specifically, the processor 1101 may be configured to: perform S51 and S52 in the embodiment shown in FIG. 5 or perform another process used to support the technology described in this specification; or perform S51 and S52 in the embodiment shown in FIG. 5 and perform another process used to support the technology described in this specification.

Alternatively, when the communications apparatus 1100 is configured to implement a function of the receiving device described above, the processor 1101 may be configured to perform S61 and S62 in the embodiment shown in FIG. 6, and/or another process used to support the technology described in this specification. Specifically the processor 1101 may be configured to: perform S61 and S62 in the embodiment shown in FIG. 6 or perform another process used to support the technology described in this specification; or perform S61 and S62 in the embodiment shown in FIG. 6 and perform another process used to support the technology described in this specification.

Alternatively, when the communications apparatus 1100 is configured to implement a function of the receiving device described above, the processor 1101 may be configured to perform S71 and S72 in the embodiment shown in FIG. 7, and/or another process used to support the technology described in this specification. Specifically, the processor 1101 may be configured to: perform S71 and S72 in the embodiment shown in FIG. 7 or perform another process used to support the technology described in this specification; or perform S71 and S72 in the embodiment shown in FIG. 7 and perform another process used to support the technology described in this specification.

The communications apparatus 1100 may be implemented by a field-programmable gate array (field-programmable gate array, FPGA), an application-specific integrated circuit (application-specific integrated circuit, ASIC), a system on chip (system on chip, SoC), a central processing unit (central processing unit, CPU), a network processor (network processor, NP), a digital signal processor (digital signal processor, DSP), a micro controller unit (micro controller unit, MCU), a programmable logic device (programmable logic device. PLD), or another integrated chip. The communications apparatus 1100 may be disposed in the receiving device in the embodiments of this application, so that the receiving device implements the method provided in the embodiments of this application.

In an optional implementation, the communications apparatus 1100 may include a transceiver component, configured to communicate with another device. When the communications apparatus 1100 is configured to implement the function of the receiving device described above, the transceiver component may be configured to perform all receiving and sending operations performed by the receiving device in the embodiment shown in FIG. 5, for example, may be configured to perform a step such as receiving a data packet from a transmitting device, sending an RRC connection establishment complete message to a network device, or sending a status report to a network device in the embodiment shown in FIG. 5, and/or another process used to support the technology described in this specification. Specifically, the transceiver component may be configured to: perform all the receiving and sending operations performed by the receiving device in the embodiment shown in FIG. 5 or perform another process used to support the technology described in this specification; or perform all the receiving and sending operations performed by the receiving device in the embodiment shown in FIG. 5 and perform another process used to support the technology described in this specification.

Alternatively, when the communications apparatus 1100 is configured to implement the function of the receiving device described above, the transceiver component may be configured to perform all receiving and sending operations performed by the receiving device in the embodiment shown in FIG. 6, for example, may perform a step such as receiving a data packet from a transmitting device, and/or another process used to support the technology described in this specification. Specifically, the transceiver component may be configured to: perform all the receiving and sending operations performed by the receiving device in the embodiment shown in FIG. 6 or perform another process used to support the technology described in this specification; or perform all the receiving and sending operations performed by the receiving device in the embodiment shown in FIG. 6 and perform another process used to support the technology described in this specification.

Alternatively, when the communications apparatus 1100 is configured to implement the function of the receiving device described above, the transceiver component may be configured to perform all receiving and sending operations performed by the receiving device in the embodiment shown in FIG. 7, for example, may perform a step such as receiving a data packet from a transmitting device, and/or another process used to support the technology described in this specification. Specifically, the transceiver component may be configured to: perform all the receiving and sending operations performed by the receiving device in the embodiment shown in FIG. 7 or perform another process used to support the technology described in this specification; or perform all the receiving and sending operations performed by the receiving device in the embodiment shown in FIG. 7 and perform another process used to support the technology described in this specification.

Figure 11B:
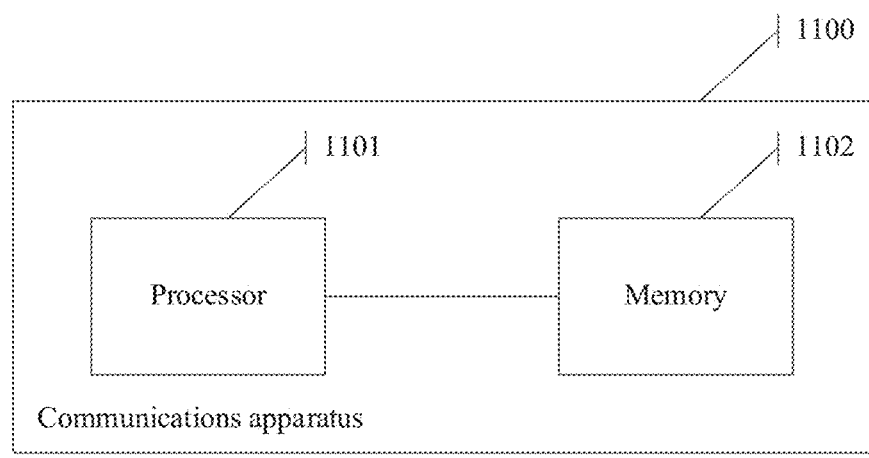

In an optional implementation, the communications apparatus 1100 may further include a memory 1102, referring to FIG. 11B. The memory 1102 is configured to store computer programs or instructions, and the processor 1101 is configured to decode and execute the computer programs or the instructions. It should be understood that, the computer programs or the instructions may include function programs of the foregoing receiving device. When the function programs of the receiving device are decoded and executed by the processor 1101, the communications apparatus 1000 may be enabled to implement a function of the receiving device in the method provided in the embodiment shown in FIG. 5 in the embodiments of this application, or implement a function of the receiving device in the method provided in the embodiment shown in FIG. 6 in the embodiments of this application, or implement a function of the receiving device in the method provided in the embodiment shown in FIG. 7 in the embodiments of this application.

In another optional implementation, the function programs of the receiving device are stored in an external memory of the communications apparatus 1100. When the function programs of the receiving device are decoded and executed by the processor 1101, the memory 1102 temporarily stores some or all content of the function programs of the receiving device.

In another optional implementation, the function programs of the receiving device are stored in the internal memory 1102 of the communications apparatus 1100. When the internal memory 1102 of the communications apparatus 1100 stores the function programs of the receiving device, the communications apparatus 1100 may be disposed in the receiving device in the embodiments of this application.

In still another optional implementation, some content of the function programs of the receiving device is stored in an external memory of the communications apparatus 1100, and the other content of the function programs of the receiving device is stored in the internal memory 1102 of the communications apparatus 1100.

In the embodiments of this application, the communications apparatus 800, the communications apparatus 900, the communications apparatus 1000, the communications apparatus 1100, and the communications apparatus 1100 are presented in a form in which each functional module is obtained through division based on each function, or may be presented in a form in which each functional module is obtained through division in an integrated manner. The "module" herein may be an ASIC, a processor and a memory that execute one or more software or firmware programs, an integrated logic circuit, and/or another component that can provide the foregoing functions.

In addition, the first type of communications apparatus described above may alternatively be implemented in another form. For example, the communications apparatus includes a processing module and a transceiver module. For example, the processing module may be implemented by using the processor 801, and the transceiver module may be implemented by using the transceiver 802. The processing module may be configured to perform S51 and S52 in the embodiment shown in FIG. 5, and/or another process used to support the technology described in this specification. Specifically, the processing module may be configured to: perform S51 and S52 in the embodiment shown in FIG. 5 or perform another process used to support the technology described in this specification; or perform S51 and S52 in the embodiment shown in FIG. 5 and perform another process used to support the technology described in this specification. Optionally, the communications apparatus may further include the transceiver module. The transceiver module may be configured to perform all receiving and sending operations performed by the receiving device in the embodiment shown in FIG. 5, for example, may be configured to perform a step such as receiving a data packet from a transmitting device, sending an RRC connection establishment complete message to a network device, or sending a status report to a network device in the embodiment shown in FIG. 5, and/or another process used to support the technology described in this specification. Specifically, the transceiver module may be configured to: perform all the receiving and sending operations performed by the receiving device in the embodiment shown in FIG. 5 or perform another process used to support the technology described in this specification; or perform all the receiving and sending operations performed by the receiving device in the embodiment shown in FIG. 5 and perform another process used to support the technology described in this specification. Optionally, the communications apparatus may further include a storage module, and the storage module may be configured to store instructions required by the processing module to perform a task.

For example, the processing module is configured to perform re-establishment or data recovery on a PDCP layer of the communications apparatus.

The processing module is further configured to: if a reordering timer of the PDCP layer is in a running state, stop running of the reordering timer by using the PDCP layer, where the reordering timer is used by the PDCP layer to wait to receive a lost data packet.

In a possible implementation, total duration of the reordering timer is less than a first threshold, and/or remaining running duration of the reordering timer is less than a second threshold; or a time interval used to determine service interruption is greater than or equal to a third threshold, where when a time interval at which the processing module delivers data packets to an upper layer of the PDCP layer twice by using the PDCP layer is greater than or equal to the time interval used to determine service interruption, the processing module determines, by using the upper layer of the PDCP layer, that service interruption occurs.

In a possible implementation, the processing module is further configured to reset the reordering timer by using the PDCP layer.

In a possible implementation, the processing module is further configured to: after stopping running of the reordering timer by using the PDCP layer, start the reordering timer by using the PDCP layer when a first condition is satisfied.

In a possible implementation, the first condition includes one or any combination of the following:

the processing module receives a first data packet by using the PDCP layer, and the processing module determines, by using the PDCP layer, that a value obtained by adding 1 to a largest count value of a data packet received by the PDCP layer is greater than a count value of the 1st data packet that is not received by the PDCP layer before the reordering timer is last started;

the processing module receives a first data packet by using the PDCP layer, and the processing module determines, by using the PDCP layer, that a value obtained by adding 1 to a largest count value of a data packet received by the PDCP layer is greater than a count value of the 1st data packet that is not received by the PDCP layer;

the processing module receives a first data packet by using the PDCP layer, and the processing module determines, by using the PDCP layer, that a first variable is greater than a second variable, where the first variable is used to indicate a count value of a next data packet that the communications apparatus expects to receive, and the second variable indicates a count value of the 1st data packet that is not delivered to the upper layer and for which the PDCP layer still waits;

the transceiver module completes sending an RRC connection establishment complete message to a network device, where the RRC connection complete message is used to indicate that the communications apparatus completes cell handover or change; or the transceiver module completes sending a status report to a network device, where the status report is used to indicate information about a data packet received by the communications apparatus before the communications apparatus is handed over to the network device.

In a possible implementation, the re-establishment of the PDCP layer is re-establishment of a PDCP layer for an AM DRB; or the data recovery of the PDCP layer is data recovery of a PDCP layer for an AM DRB.

All related content of the steps in the foregoing method embodiment may be cited in function descriptions of the corresponding functional modules. Details are not described herein again.

The second type of communications apparatus described above may alternatively be implemented in another form. For example, the communications apparatus includes a processing module and a transceiver module. For example, the processing module may be implemented by using the processor 901, and the transceiver module may be implemented by using the transceiver 902. The processing module may be configured to perform S61 and S62 in the embodiment shown in FIG. 6, and/or another process used to support the technology described in this specification. Specifically, the processing module may be configured to: perform S61 and S62 in the embodiment shown in FIG. 6 or perform another process used to support the technology described in this specification; or perform S61 and S62 in the embodiment shown in FIG. 6 and perform another process used to support the technology described in this specification. Optionally, the communications apparatus may further include the transceiver module. The transceiver module may be configured to perform all receiving and sending operations performed by the receiving device in the embodiment shown in FIG. 6, for example, may perform a step such as receiving a data packet from a transmitting device, and/or another process used to support the technology described in this specification. Specifically, the transceiver module may be configured to: perform all the receiving and sending operations performed by the receiving device in the embodiment shown in FIG. 6 or perform another process used to support the technology described in this specification; or perform all the receiving and sending operations performed by the receiving device in the embodiment shown in FIG. 6 and perform another process used to support the technology described in this specification. Optionally, the communications apparatus may further include a storage module, and the storage module may be configured to store instructions required by the processing module to perform a task.

For example, the processing module is configured to perform re-establishment or data recovery on a PDCP layer of the communications apparatus.

The processing module is further configured to: if a reordering timer of the PDCP layer is in a running state, restart the reordering timer by using the PDCP layer, where the reordering timer is used by the PDCP layer to wait to receive a lost data packet.

In a possible implementation, total duration of the reordering timer is less than a first threshold, and/or remaining running duration of the reordering timer is less than a second threshold; or a time interval used to determine service interruption is greater than or equal to a third threshold, where when a time interval at which the PDCP layer delivers data packets to an upper layer of the PDCP layer twice is greater than or equal to the time interval used to determine service interruption, the processing module determines, by using the upper layer of the PDCP layer, that service interruption occurs.

In a possible implementation, the processing module is configured to restart the reordering timer by using the PDCP layer in the following manner:

stopping and resetting the reordering timer by using the PDCP layer, and restarting the reordering timer.

In a possible implementation, in a re-establishment process of the PDCP layer, the processing module is further configured to: when the reordering timer expires, restart the reordering timer by using the PDCP layer; and not deliver, to the upper layer of the PDCP layer, a data packet whose count value is greater than a count value of the 1st data packet that is not received by the PDCP layer.

In a possible implementation, the re-establishment of the PDCP layer is re-establishment of a PDCP layer for an AM DRB; or the data recovery of the PDCP layer is data recovery of a PDCP layer for an AM DRB.

All related content of the steps in the foregoing method embodiment may be cited in function descriptions of the corresponding functional modules. Details are not described herein again.

The third type of communications apparatus described above may alternatively be implemented in another form. For example, the communications apparatus includes a processing module and a transceiver module. For example, the processing module may be implemented by using the processor 1001, and the transceiver module may be implemented by using the transceiver 1002. The processing module may be configured to perform S71 and S72 in the embodiment shown in FIG. 7, and/or another process used to support the technology described in this specification. Specifically, the processing module may be configured to: perform S71 and S72 in the embodiment shown in FIG. 7 or perform another process used to support the technology described in this specification; or perform S71 and S72 in the embodiment shown in FIG. 7 and perform another process used to support the technology described in this specification. Optionally, the communications apparatus may further include the transceiver module. The transceiver module may be configured to perform all receiving and sending operations performed by the receiving device in the embodiment shown in FIG. 7, for example, may perform a step such as receiving a data packet from a transmitting device, and/or another process used to support the technology described in this specification. Specifically, the transceiver module may be configured to: perform all the receiving and sending operations performed by the receiving device in the embodiment shown in FIG. 7 or perform another process used to support the technology described in this specification, or perform all the receiving and sending operations performed by the receiving device in the embodiment shown in FIG. 7 and perform another process used to support the technology described in this specification. Optionally, the communications apparatus may further include a storage module, and the storage module may be configured to store instructions required by the processing module to perform a task.

For example, the processing module is configured to determine that a reordering timer of a PDCP layer of the communications apparatus expires, where the reordering timer is used by the PDCP layer to wait to receive a lost data packet.

The processing module is further configured to: when a first condition is satisfied, not deliver, to an upper layer of the PDCP layer by using the PDCP layer, a data packet whose count value is greater than a count value of the 1st data packet that is not received by the PDCP layer.

In a possible implementation, when the first condition is satisfied, the processing module is further configured to: stop and reset the reordering timer by using the PDCP layer, and restart the reordering timer.

In a possible implementation, the first condition includes one or any combination of the following:

before the communications apparatus re-establishes the PDCP layer;

in a process in which the communications apparatus re-establishes the PDCP layer;

after the communications apparatus completes cell handover and before the PDCP layer receives the 1st data packet;

the transceiver module completes sending an RRC connection establishment complete message to a network device, where the RRC connection establishment complete message is used to indicate that the communications apparatus completes cell handover;

the transceiver module completes sending a status report to a network device, where the status report is used to indicate information about a data packet received by the receiving device before the receiving device is handed over to the network device; or before the communications apparatus completes a random access process.

In a possible implementation, total duration of the reordering timer is less than a first threshold, and/or remaining running duration of the reordering timer is less than a second threshold; or a time interval used to determine service interruption is greater than or equal to a third threshold, where when a time interval at which the PDCP layer delivers data packets to the upper layer of the PDCP layer twice is greater than or equal to the time interval used to determine service interruption, the processing module determines, by using the upper layer of the PDCP layer, that service interruption occurs.

In a possible implementation.

the re-establishment of the PDCP layer is re-establishment of a PDCP layer for an AM DRB; or data recovery of the PDCP layer is data recovery of a PDCP layer for an AM DRB.

All related content of the steps in the foregoing method embodiment may be cited in function descriptions of the corresponding functional modules. Details are not described herein again.

The communications apparatus 800, the communications apparatus 900, the communications apparatus 1000, and the communications apparatus 1100 provided in the embodiments of this application may be configured to perform the method provided in the embodiment shown in FIG. 5, the method provided in the embodiment shown in FIG. 6, or the method provided in the embodiment shown in FIG. 7. Therefore, for technical effects that can be achieved by the communications apparatus 800, the communications apparatus 900, the communications apparatus 1000, and the communications apparatus 1100, refer to the foregoing method embodiments. Details are not described herein again.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another readable storage medium. For example, the computer instructions may be transmitted from a website, computer, server, or data center to another website, computer, server, or data center in a wired (for example, a coaxial cable, an optical fiber, or a digital subscriber line (digital subscriber line. DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (digital versatile disc, DVD)), a semiconductor medium (for example, a solid-state disk (solid-state disk, SSD)), or the like.

It is clear that a person skilled in the art can make various modifications and variations to the embodiments of this application without departing from the spirit and scope of this application. This application is intended to cover these modifications and variations of the embodiments of this application provided that they fall within the scope of protection defined by the following claims and their equivalent technologies.

What is claimed is:

1. A method comprising:
   performing, by a receiving device, a re-establishment or a data recovery of a Packet Data Convergence Protocol (PDCP) layer of the receiving device;
   stopping, by the PDCP layer, running a reordering timer of the PDCP layer in response to the re-establishment or the data recovery of the PDCP layer; and
   storing, by the PDCP layer when the reordering timer is stopped, one or more out-of-order data packets received by the PDCP layer,
   wherein the PDCP layer does not deliver the one or more out-of-order data packets to an upper layer of the PDCP layer when the reordering timer is stopped,
   wherein the reordering timer enables the PDCP layer to wait to receive a lost data packet.

2. The method of claim 1, wherein a total duration of the reordering timer is less than a first threshold and a remaining running duration of the reordering timer is less than a second threshold.

3. The method of claim 1, further comprising resetting, by the PDCP layer, the reordering timer.

4. The method of claim 1, wherein after stopping running the reordering timer, the method further comprises starting, by the PDCP layer, the reordering timer when a first condition is satisfied.

5. The method of claim 4, wherein the first condition comprises:
   receiving, by the PDCP layer, a first data packet, and determining, by the PDCP layer, that a first value obtained by adding one to a largest count value of a second data packet received by the PDCP layer is greater than a first count value of the first data packet not received by the PDCP layer before the reordering timer last started;
   receiving, by the PDCP layer, the first data packet, and determining, by the PDCP layer, that the first value is greater than a second count value of the first data packet not received by the PDCP layer;
   receiving, by the PDCP layer, the first data packet, and determining, by the PDCP layer, that a first variable is greater than a second variable, wherein the first variable indicates a third count value of a next data packet that the receiving device expects to receive, and wherein the second variable indicates a fourth count value of the first data packet not delivered to the upper layer of the PDCP layer and for which the PDCP layer waits;
   sending, by the receiving device, Radio Resource Control (RRC) connection establishment complete message to a network device, wherein the RRC connection establishment complete message indicates that the receiving device completes a cell handover or a change; or
   sending, by the receiving device, a status report to the network device, wherein the status report indicates a third data packet received by the receiving device before the receiving device has been handed over to the network device.

6. The method of claim 1, further comprising:
   performing, by the receiving device, the re-establishment of the PDCP layer for an acknowledged mode (AM) data radio bearer (DRB); or
   performing, by the receiving device, the data recovery of the PDCP layer for the AM DRB.

7. The method of claim 1, wherein a total duration of the reordering timer is less than a first threshold.

8. The method of claim 1, wherein a remaining running duration of the reordering timer is less than a second threshold.

9. The method of claim 1, wherein a first time interval used to determine a service interruption is greater than or equal to a third threshold, wherein when a second time interval when the PDCP layer delivers data packets to the upper layer of the PDCP layer twice is greater than or equal to the first time interval, and wherein the upper layer determines that the service interruption has occurred.

10. A communications device comprising:
    a memory configured to store instructions; and
    a processor coupled to the memory, wherein the instructions cause the processor to be configured to:
       perform a re-establishment or a data recovery of a Packet Data Convergence Protocol (PDCP) layer of the communications device;
       stop, by the PDCP layer, running a reordering timer of the PDCP layer in response to the re-establishment or the data recovery of the PDCP layer; and
       store, by the PDCP layer when the reordering timer is stopped, one or more out-of-order data packets received by the PDCP layer,
       wherein the PDCP layer does not deliver the one or more out-of-order data packets to an upper layer of the PDCP layer when the reordering time is stopped,
       wherein the reordering timer enables the PDCP layer to wait to receive a lost data packet.

11. The communications device of claim 10, wherein the instructions further cause the processor to be configured to:
    identify that either a total duration of the reordering timer is less than a first threshold or a remaining running duration of the reordering timer is less than a second threshold; or
    identify that a first time interval used to determine a service interruption is greater than or equal to a third threshold, wherein when a second time interval when the PDCP layer delivers data packets to the upper layer of the PDCP layer twice is greater than or equal to the first time interval, and wherein the upper layer is configured to determine that the service interruption has occurred.

12. The communications device of claim 10, wherein the instructions further cause the processor to be configured to reset, by the PDCP layer, the reordering timer.

13. The communications device of claim 10, wherein the instructions further cause the processor to be configured to start, by the PDCP layer, the reordering timer when a first condition is satisfied.

14. The communications device of claim 13, further comprising a transceiver coupled to the processor, wherein the first condition comprises:
    the processor is configured to receive, using the PDCP layer, a first data packet and determine, that a first value obtained by adding one to a largest count value of a second data packet received by the PDCP layer is greater than a first count value of the first data packet not received by the PDCP layer before the reordering timer last started;

the processor is configured to receive, using the PDCP layer, the first data packet and determine that the first value is greater than a second count value of the first data packet not received by the PDCP layer;

the processor is configured to receive, using the PDCP layer, the first data packet and determine that a first variable is greater than a second variable, wherein the first variable indicates a third count value of a next data packet that the communications device expects to receive, and wherein the second variable indicates a fourth count value of the first data packet that is not delivered to the upper layer of the PDCP layer and for which the PDCP layer waits;

the transceiver is configured to send a Radio Resource Control (RRC) connection establishment complete message to a network device, wherein the RRC connection establishment complete message indicates that the communications device completes a cell handover or a change; or the transceiver is configured to send a status report to the network device, wherein the status report indicates a third data packet received by the communications device before the communications device has been handed over to the network device.

15. The communications device of claim 10, wherein the instructions further cause the processor to be configured to:
perform the re-establishment of the PDCP layer for an acknowledged mode (AM) data radio bearer (DRB); or
perform the data recovery of the PDCP layer for the AM DRB.

16. A communications device, comprising:
a memory configured to store instructions; and
a processor coupled to the memory, wherein the instructions cause the processor to be configured to:
perform a re-establishment or a data recovery of a Packet Data Convergence Protocol (PDCP) layer of the communications device;
restart, using the PDCP layer, a reordering timer of the PDCP layer in response to the re-establishment or the data recover of the PDCP layer; and
store, by the PDCP layer when the reordering tinier is stopped, one or more out-of-order data packets received by the PDCP layer,
wherein the PDCP layer does not deliver the one or more out-of-order data packets to an upper layer of the PDCP layer when the reordering time is stopped,
wherein the reordering timer enables the PDCP layer to wait to receive a lost data packet.

17. The communications device of claim 16, wherein a total duration of the reordering timer is less than a first threshold or a remaining running duration of the reordering timer is less than a second threshold, or a first time interval used to determine a service interruption is greater than or equal to a third threshold, wherein when a second time interval when the PDCP layer delivers data packets to the upper layer of the PDCP layer twice is greater than or equal to the first time interval, and wherein the instructions further cause the processor to be configured to determine, using the upper layer, that the service interruption has occurred.

18. The communications device of claim 16, wherein the instructions further cause the processor to be configured to stop and reset, using the PDCP layer, the reordering timer.

19. The communications device of claim 16, wherein the instructions further cause the processor to be configured to:
restart, using the PDCP layer, the reordering timer when the reordering timer expires; and
avoid delivering, to the upper layer of the PDCP layer, a second data packet having a first count value greater than a second count value of a first data packet not received by the PDCP layer.

20. The communications device of claim 16, wherein the instructions further cause the processor to be configured to:
perform the re-establishment of the PDCP layer for an acknowledged mode (AM) data radio bearer (DRB); or
perform the data recovery of the PDCP layer for the AM DRB.

* * * * *

UNITED STATES PATENT AND TRADEMARK OFFICE
CERTIFICATE OF CORRECTION

PATENT NO. : 11,627,190 B2  
APPLICATION NO. : 17/442934  
DATED : April 11, 2023  
INVENTOR(S) : Chuting Yao et al.

Page 1 of 1

It is certified that error appears in the above-identified patent and that said Letters Patent is hereby corrected as shown below:

In the Claims

Claim 16, Column 60, Line 4: "the reordering tinier is" should read "the reordering timer is"

Claim 16, Column 60, Line 9: "the reordering time is" should read "the reordering timer is"

Signed and Sealed this
Twenty-third Day of May, 2023

Katherine Kelly Vidal
*Director of the United States Patent and Trademark Office*